United States Patent
Vassilieva et al.

(10) Patent No.: US 10,511,388 B1
(45) Date of Patent: Dec. 17, 2019

(54) REDUCING VARIANCE IN REACH OF WDM CHANNELS IN AN OPTICAL NETWORK

(71) Applicant: Fujitsu Limited, Kawasaki-shi, Kanagawa (JP)

(72) Inventors: Olga I. Vassilieva, Plano, TX (US); Inwoong Kim, Allen, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/100,409

(22) Filed: Aug. 10, 2018

(51) Int. Cl.
  *H04B 10/532* (2013.01)
  *H04B 10/548* (2013.01)
  *H04B 10/079* (2013.01)
  *H04B 10/61* (2013.01)
  *H04B 10/516* (2013.01)

(52) U.S. Cl.
  CPC ..... *H04B 10/532* (2013.01); *H04B 10/07953* (2013.01); *H04B 10/5161* (2013.01); *H04B 10/548* (2013.01); *H04B 10/612* (2013.01); *H04B 10/6162* (2013.01)

(58) Field of Classification Search
  CPC ............. H04B 10/516; H04B 10/5161; H04B 10/541; H04B 10/548; H04B 10/54; H04B 10/61; H04B 10/40; H04B 10/506; H04J 14/02; H04L 27/34; H04L 2025/03401; H04L 2025/0342
  See application file for complete search history.

(56) References Cited

U.S. PATENT DOCUMENTS

| | | | |
|---|---|---|---|
| 8,983,294 B2 * | 3/2015 | Pfau | H04J 14/06 398/203 |
| 9,673,907 B1 * | 6/2017 | Vassilieva | H04B 10/5161 |
| 10,250,333 B2 * | 4/2019 | Kikuchi | H04B 10/2513 |
| 10,256,946 B2 * | 4/2019 | Calabro | H04B 10/548 |
| 2008/0159423 A1 * | 7/2008 | Omoto | H04L 5/0048 375/260 |

(Continued)

OTHER PUBLICATIONS

Buchali, Fred, et al. "Rate adaptation and reach increase by probabilistically shaped 64-QAM: An experimental demonstration." *Journal of Lightwave Technology* 34.7 (2016): 1599-1609; 11 pages.

(Continued)

*Primary Examiner* — Tanya T Motsinger
(74) *Attorney, Agent, or Firm* — Baker Botts L.L.P.

(57) ABSTRACT

Systems and methods for reducing variance in reach of wavelength division multiplexed (WDM) channels in optical transport networks may include selecting, for each channel assigned to a respective wavelength, an initial modulation format and an initial distribution of constellation points in the complex plane, determining a target reach for all WDM channels that is achievable by higher wavelength channels but not by shorter wavelength channels, and applying one or more reach extension techniques to at least one shorter wavelength channel but not to the higher wavelength channels. The reach extension techniques may include probabilistic constellation shaping, symbol rate optimized subcarrier multiplexing, or a combination of the two. Transponders may be configurable to transmit or receive traffic over the WDM channels with or without implementing the reach extension techniques, as applicable.

17 Claims, 15 Drawing Sheets

(56) References Cited

U.S. PATENT DOCUMENTS

| | | | | |
|---|---|---|---|---|
| 2009/0208224 A1* | 8/2009 | Kikuchi | | H04B 10/672 |
| | | | | 398/141 |
| 2011/0305457 A1* | 12/2011 | Kikuchi | | H04B 10/5055 |
| | | | | 398/65 |
| 2012/0224855 A1* | 9/2012 | Liu | | H04B 10/2543 |
| | | | | 398/79 |
| 2013/0138375 A1* | 5/2013 | Zhou | | H04B 10/6166 |
| | | | | 702/66 |
| 2014/0376925 A1* | 12/2014 | Koike-Akino | | H03M 13/251 |
| | | | | 398/188 |
| 2015/0333825 A1* | 11/2015 | Kim | | H04B 10/07953 |
| | | | | 398/26 |
| 2016/0006538 A1* | 1/2016 | Yoshida | | H04B 10/532 |
| | | | | 398/65 |
| 2016/0036532 A1* | 2/2016 | Noguchi | | H04B 10/50572 |
| | | | | 398/38 |
| 2016/0127046 A1* | 5/2016 | Zhang | | H04L 27/183 |
| | | | | 398/185 |
| 2016/0182270 A1* | 6/2016 | Jungnickel | | H04L 25/03828 |
| | | | | 375/260 |
| 2016/0226625 A1* | 8/2016 | Millar | | H04L 1/0041 |
| 2016/0294480 A1* | 10/2016 | Mertz | | H04B 10/6163 |
| 2017/0126353 A1* | 5/2017 | Croussore | | H04B 10/6161 |
| 2017/0134120 A1* | 5/2017 | Calabro | | H04B 10/548 |
| 2017/0222716 A1* | 8/2017 | Nakashima | | H04B 10/548 |
| 2017/0250758 A1* | 8/2017 | Kikuchi | | H04B 10/2513 |
| 2018/0076930 A1* | 3/2018 | Buchali | | H04L 1/007 |
| 2018/0139520 A1* | 5/2018 | Xiao | | G02B 6/2938 |
| 2018/0234199 A1* | 8/2018 | Bouda | | H04J 14/0202 |
| 2019/0020418 A1* | 1/2019 | Yamauchi | | H04B 10/5161 |
| 2019/0097747 A1* | 3/2019 | Kim | | H04B 10/0793 |

OTHER PUBLICATIONS

Nakashima, Hisao, et al. "Experimental investigation on nonlinear tolerance of subcarrier multiplexed signals with spectrum optimization." *Optical Communication (ECOC)*, 2015 European Conference on. IEEE, 2015; 3 pages.

Buchali, Fred, et al. "Study of electrical subband multiplexing at 54 GHz modulation bandwidth for 16QAM and probabilistically shaped 64QAM." *ECOC 2016; 42nd European Conference on Optical Communication; Proceedings of.* VDE, 2016; 3 pages.

* cited by examiner

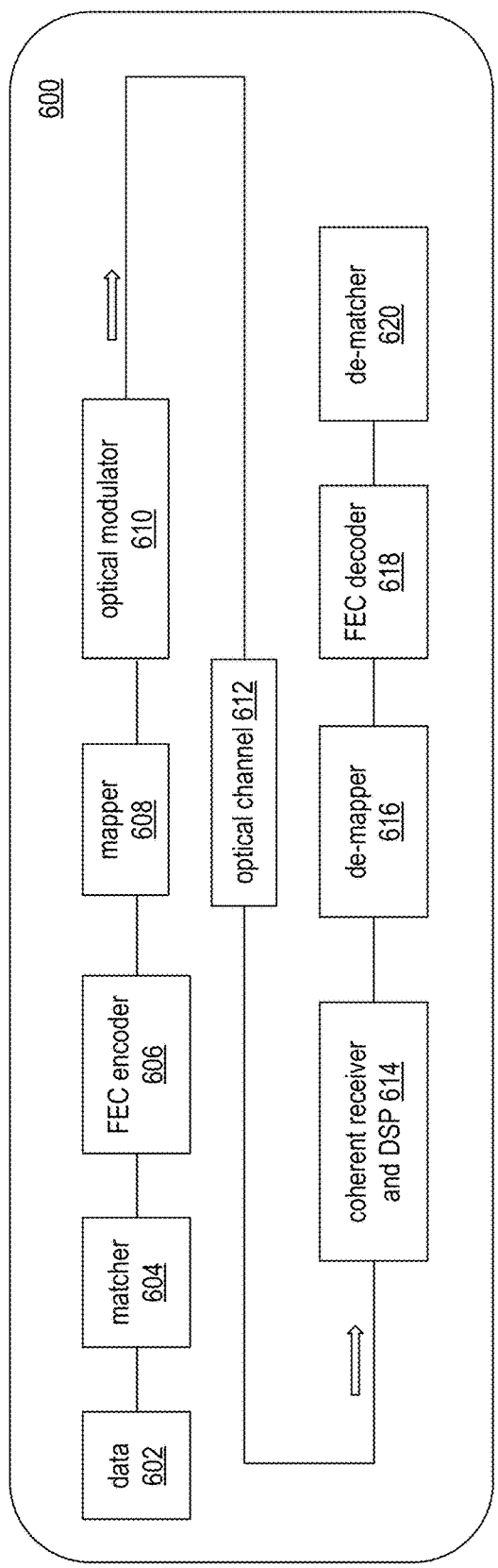
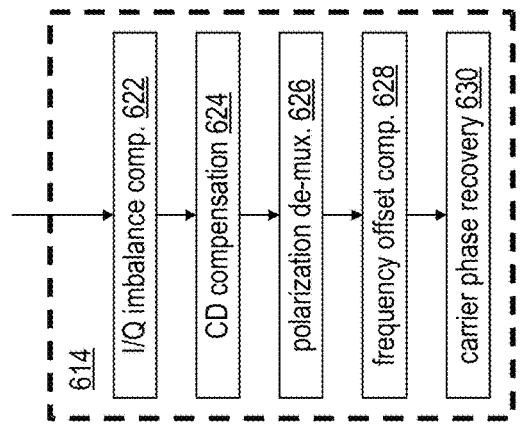
FIG. 6A
FIG. 6B

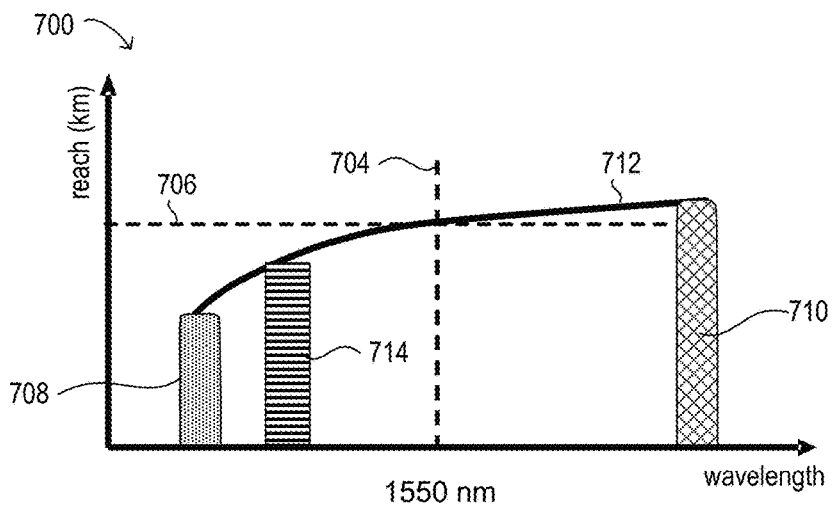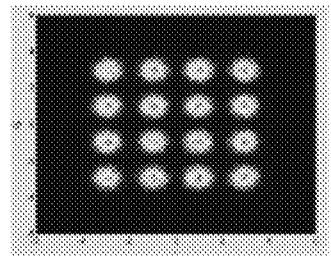
FIG. 7A
FIG. 7B
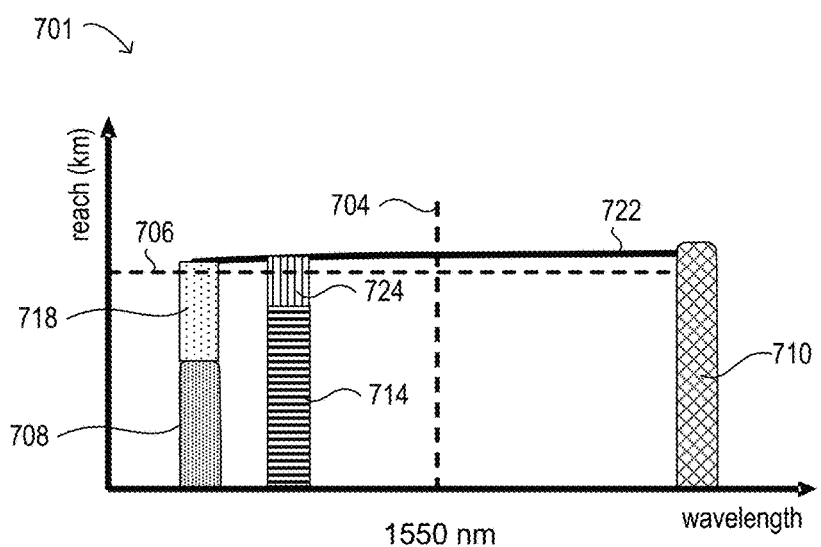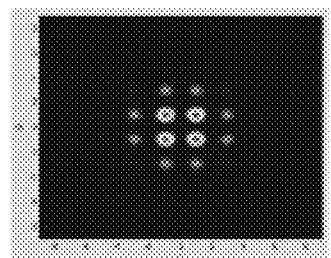
FIG. 7C
FIG. 7D

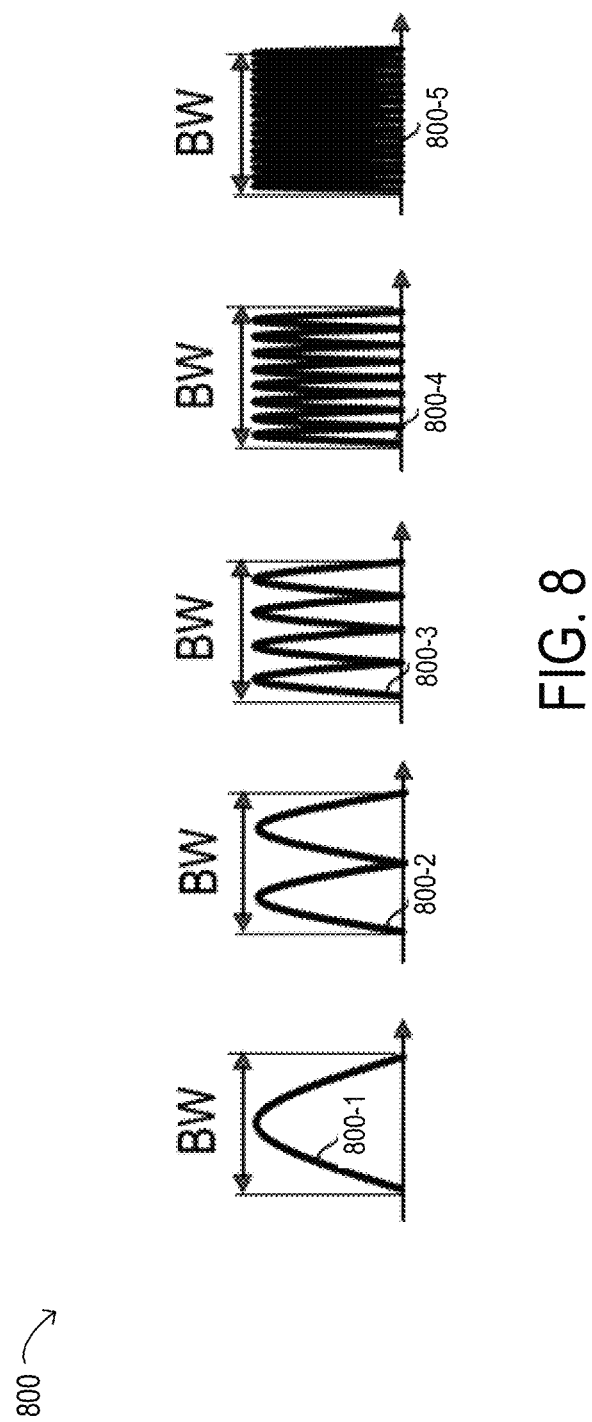

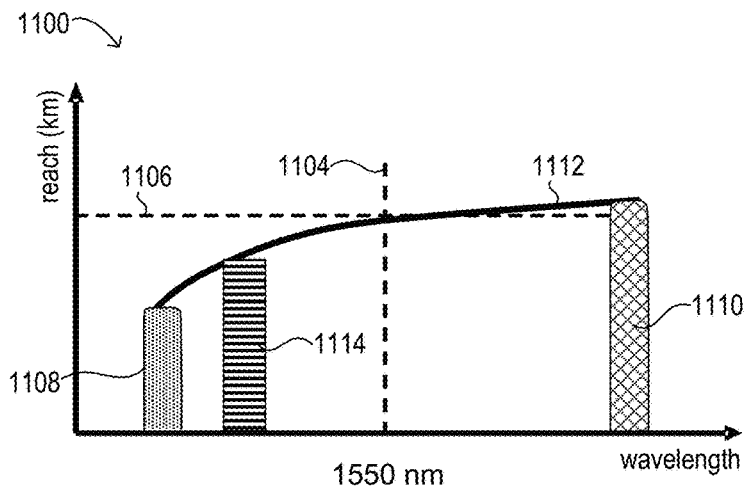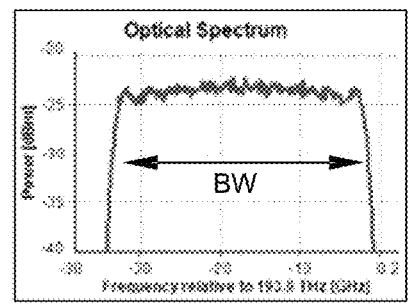
FIG. 11A  FIG. 11B
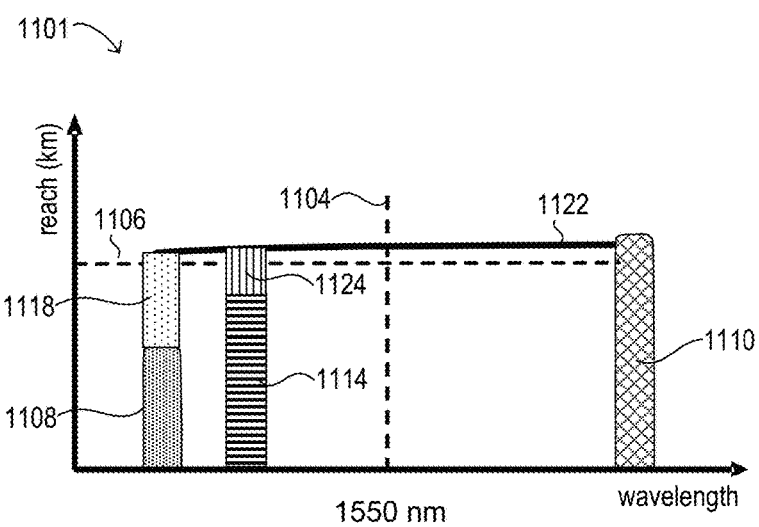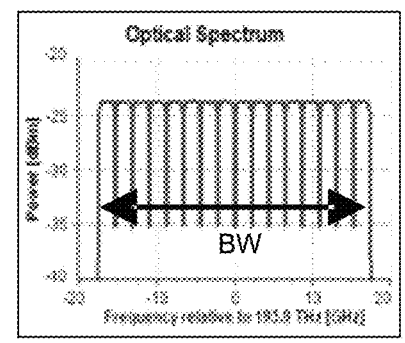
FIG. 11C  FIG. 11D

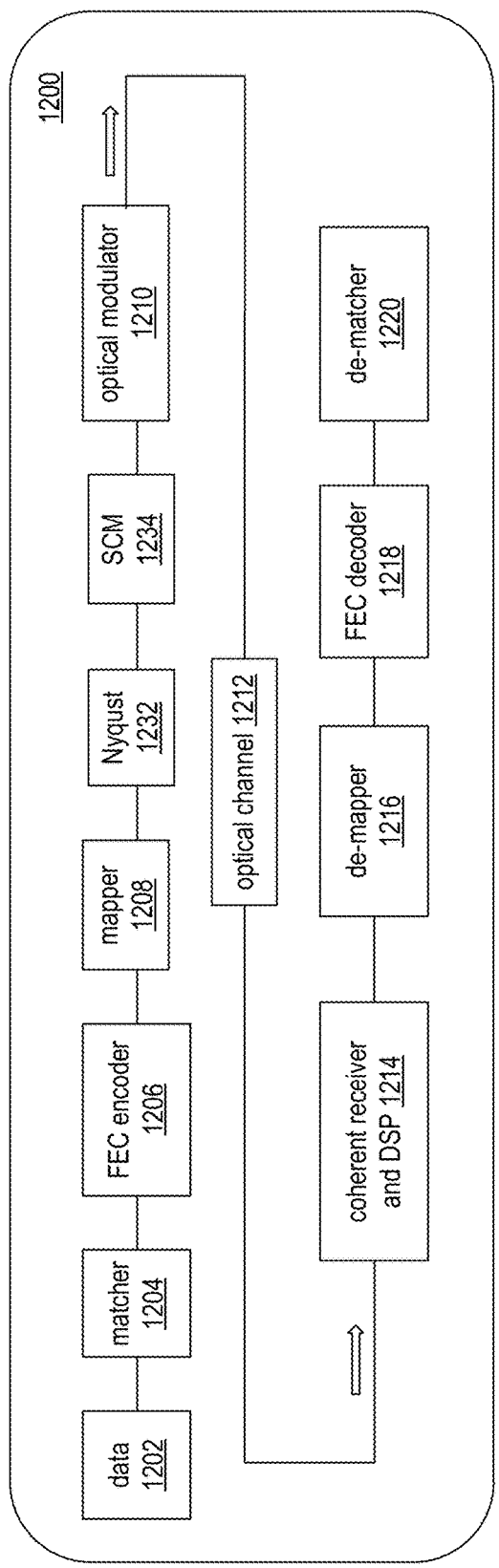
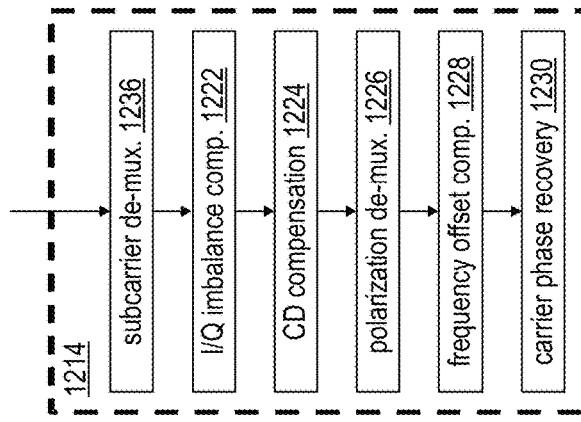
FIG. 12A
FIG. 12B

REDUCING VARIANCE IN REACH OF WDM CHANNELS IN AN OPTICAL NETWORK

BACKGROUND

Field of the Disclosure

The present disclosure relates generally to optical communication networks and, more particularly, to reducing variance in reach of wavelength division multiplexed (WDM) channels in optical networks.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of optical signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency, enabling superchannels to achieve an increase in data capacity. However, the reach of optical signals, even when using superchannels, may still be limited by optical signal-to-noise ratio (OSNR) levels experienced during transmission. Some existing systems implement methods for extending the transmission reach of various optical channels including, for example, subcarrier power pre-emphasis of optical superchannels or nonlinearity mitigation using digital back-propagation (DBP).

Existing optical transport networks are typically configured as fixed (static) networks. These optical networks are often designed for worst case, end-of-life scenarios, with system margin requirements that ensure the longest possible reach even as the components of the optical network age. For example, they may be designed with optical signal-to-noise ratio (OSNR) margins, which represent the difference between the actual OSNR value and the threshold OSNR value beyond which all errors are recoverable, that allow the networks to operate without errors for many years. In these optical networks, optical transmission paths on all wavelengths might reach their destinations. However, these networks may exhibit poor network capacity, with large amounts of unused margin for short reach optical transmission paths and in start-of-life scenarios.

SUMMARY

In one aspect, a method for reducing variance in reach of wavelength division multiplexed (WDM) channels in optical transport networks includes selecting, for each of a plurality of WDM channels in an optical network, each assigned to a respective wavelength within a range of wavelengths, a respective initial modulation format with an initial distribution of constellation points in the complex plane. The method also includes determining a target reach for the plurality of WDM channels that is achievable by one or more WDM channels assigned to wavelengths in an upper portion of the range using their respective initial modulation formats but is not achievable by one or more WDM channels assigned to wavelengths in a lower portion of the range using their respective initial modulation formats, where the wavelengths in the lower portion of the range are shorter than the wavelengths in the upper portion of the range. The method also includes applying one or more reach extension techniques to a given one of the one or more WDM channels assigned to wavelengths in the lower portion of the range to extend its reach to at least the target reach, refraining from applying reach extension techniques to the one or more WDM channels assigned to wavelengths in the upper portion of the range, transmitting or receiving traffic over the given one of the one or more WDM channels assigned to wavelengths in the lower portion of the range using its initial modulation format and using the one or more reach extension techniques applied to the given channel, and transmitting or receiving traffic over the one or more WDM channels assigned to wavelengths in the upper portion of the range using their respective initial modulation formats and without using reach extension techniques.

In any of the disclosed embodiments, determining the target reach may include calculating an expected reach for a channel assigned at a wavelength within a center portion of the range between the upper portion of the range and the lower portion of the range.

In any of the disclosed embodiments, applying the one or more reach extension techniques to the given channel may include applying probabilistic constellation shaping to the given channel.

In any of the disclosed embodiments, applying probabilistic constellation shaping to the given channel may include at least one of selecting a higher order modulation format for the given channel than its initial modulation format, and selecting, dependent on a target spectral efficiency for the given channel, a weak probabilistic shaping technique or a strong probabilistic shaping technique.

In any of the disclosed embodiments, applying the one or more reach extension techniques to the given channel may include activating symbol rate optimized subcarrier multiplexing for the given channel.

In any of the disclosed embodiments, applying the one or more reach extension techniques to the given channel may further include selecting, dependent on characteristics of transmission media for the given channel and the target reach, a symbol rate for the given channel, and determining, dependent on the selected symbol rate, a number of subcarriers for the given channel.

In any of the disclosed embodiments, the method may further include applying one or more reach extension techniques to another one of the one or more WDM channels assigned to wavelengths in the lower portion of the range to extend its reach to at least the target reach.

In any of the disclosed embodiments, at least one of the reach extension techniques applied to the other channel may be different than the one or more reach extension techniques applied to the given channel.

In any of the disclosed embodiments, applying the one or more reach extension techniques to the given channel may include applying probabilistic constellation shaping to the given channel and activating symbol rate optimized subcarrier multiplexing for the given channel.

In any of the disclosed embodiments, the method may further include configuring one or more transponders to transmit or receive traffic over the given channel using its initial modulation format and using the one or more reach extension techniques applied to the given channel, and to transmit or receive traffic over the one or more channels assigned to wavelengths in the upper portion of the range using their respective initial modulation formats and without using reach extension techniques.

In any of the disclosed embodiments, the respective initial modulation format selected for the given channel may be different from the respective initial modulation format selected for at least one other one of the plurality of WDM channels.

In any of the disclosed embodiments, applying the one or more reach extension techniques to the given channel may include applying geometric shaping to the given channel.

In another aspect, an optical transport network for constellation shaping of modulation formats includes a plurality of wavelength division multiplexed (WDM) channels, each assigned to a respective wavelength within a range of wavelengths, a network management system, and one or more transponders. The network management system is configured to select, for each of the plurality of WDM channels, a respective initial modulation format with an initial distribution of constellation points in the complex plane, to determine a target reach for the plurality of WDM channels that is achievable by one or more WDM channels assigned to wavelengths in an upper portion of the range using their respective initial modulation formats but is not achievable by one or more WDM channels assigned to wavelengths in a lower portion of the range using their respective initial modulation formats, the wavelengths in the lower portion of the range being shorter than the wavelengths in the upper portion of the range, to apply one or more reach extension techniques to a given one of the one or more WDM channels assigned to wavelengths in the lower portion of the range to extend its reach to at least the target reach, and to refrain from applying reach extension techniques to the one or more WDM channels assigned to wavelengths in the upper portion of the range. The one or more transponders are configured to transmit or receive traffic over the given one of the one or more WDM channels assigned to wavelengths in the lower portion of the range using its initial modulation format and using the one or more reach extension techniques applied to the given channel, and to transmit or receive traffic over the one or more WDM channels assigned to wavelengths in the upper portion of the range using their respective initial modulation formats and without using reach extension techniques.

In any of the disclosed embodiments, to determine the target reach, the network management system may be configured to calculate an expected reach for a channel assigned at a wavelength within a center portion of the range between the upper portion of the range and the lower portion of the range.

In any of the disclosed embodiments, to apply the one or more reach extension techniques to the given channel, the network management system may be configured to apply probabilistic constellation shaping to the given channel.

In any of the disclosed embodiments, to apply probabilistic constellation shaping to the given channel, the network management system may be configured to perform at least one of selecting a higher order modulation format for the given channel than its initial modulation format, and selecting, dependent on a target spectral efficiency for the given channel, a weak probabilistic shaping technique or a strong probabilistic shaping technique.

In any of the disclosed embodiments, to apply the one or more reach extension techniques to the given channel, the network management system may be configured to activate symbol rate optimized subcarrier multiplexing for the given channel.

In any of the disclosed embodiments, to apply the one or more reach extension techniques to the given channel, the network management system may be further configured to select, dependent on characteristics of transmission media for the given channel and the target reach, a symbol rate for the given channel, and determine, dependent on the selected symbol rate, a number of sub carriers for the given channel.

In any of the disclosed embodiments, the network management system may be further configured to apply one or more reach extension techniques to another one of the one or more WDM channels assigned to wavelengths in the lower portion of the range to extend its reach to at least the target reach.

In any of the disclosed embodiments, at least one of the reach extension techniques applied to the other channel may be different than the one or more reach extension techniques applied to the given channel.

In any of the disclosed embodiments, to apply the one or more reach extension techniques to the given channel, the network management system may be configured to apply probabilistic constellation shaping to the given channel and to activate symbol rate optimized subcarrier multiplexing for the given channel.

BRIEF DESCRIPTION OF THE DRAWINGS

For a more complete understanding of the present invention and its features and advantages, reference is now made to the following description, taken in conjunction with the accompanying drawings, in which:

FIG. 6A is a schematic diagram illustrating selected elements of an example embodiment of an optical transmission system configured to apply probabilistic shaping to WDM channels in an optical network;

FIG. 6B illustrates selected elements of an embodiment of a coherent receiver and DSP element in the optical transmission system illustrated in FIG. 6A;

FIGS. 7A through 7D illustrate the use of probabilistic constellation shaping to extend signal reach for WDM channels of an optical transport network to reduce variance in reach, according to some embodiments;

FIG. 8 illustrates selected elements of an embodiment of a superchannel;

FIGS. 11A through 11D illustrate the use of SRO subcarrier multiplexing to extend signal reach for WDM channels of an optical transport network to reduce variance in reach, according to some embodiments;

FIG. 12A is a schematic diagram illustrating selected elements of an example embodiment of an optical transmission system configured to apply both probabilistic shaping and SRO subcarrier multiplexing to WDM channels in an optical network;

FIG. 12B illustrates selected elements of an embodiment of a coherent receiver and DSP element in the optical transmission system illustrated in FIG. 12A;

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
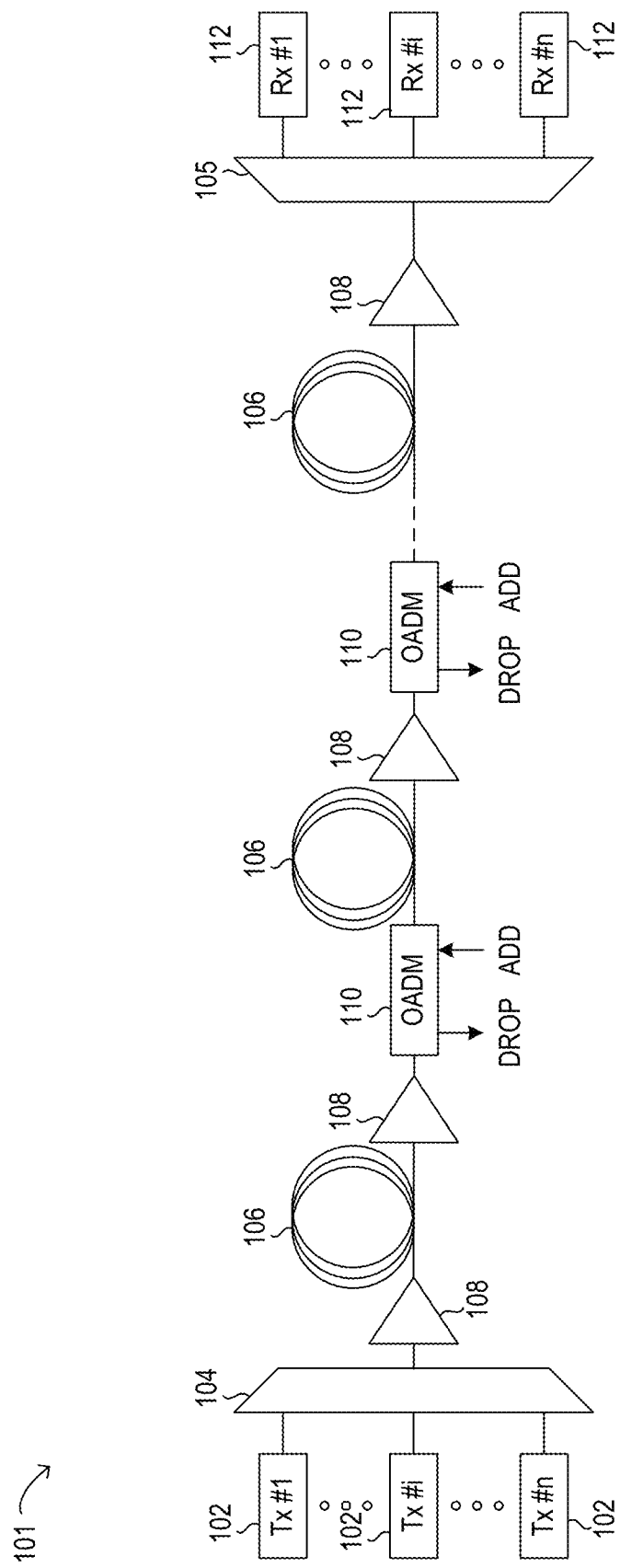
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber, among others.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate (see also FIG. 8).

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. An example of transmitter 102 for applying different modulation formats is a universally programmable transceiver. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4-QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 3) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 represents a certain transmission capacity for data. As the demand for transmission capacity continues to increase, various methods may be employed to accommodate greater transmission capacity on optical transport network 101. For example, advanced modulation formats, such as 16-QAM or 64-QAM, may be used to increase transmission capacity per wavelength channel. The advanced modulation formats may be applied using transmitter 102 and receiver 112. However, the use of advanced modulation formats may result in decreased transmission reach (also referred to simply as 'reach') of the optical signal. For example, the reach may be determined by an acceptable value for bit rate error (BER), and accordingly optical signal-to-noise ratio (OSNR), which may be observed at receivers 112.

One strategy for increasing transmission capacity is the use of a superchannel, in which a plurality of subcarrier signals are densely packed in a fixed bandwidth band and may be transmitted at very high data rates, such as 400 Gb/s, 1 Tb/s, or higher. As noted above, optical superchannels may represent a promising solution for transmission of signals at 400 Gb/s and 1 Tb/s data rate per channel. However, as noted above, superchannels are typically used with flexible grid network components, which may not be universally available. Also, administration of superchannels may be associated with additional layers of network management, which may be undesirable in certain networks. While the use of superchannels typically enables an increase in transmission capacity, the use of superchannels might not extend the transmission reach of optical signals using optical transport network 101.

As noted above, the transmission reach of an optical channel may be limited by the use of higher order modulations formats. In at least some embodiments, the systems and methods described herein may be used to reduce the variance in transmission signal reach for WDM channels in an optical transmission system by applying one or more reach extension techniques to some, but not all, of the channels in the network. For example, in operation of optical transport network 101, in order to extend the transmission reach of certain optical signals, such as high capacity optical signals modulated using an advanced modulation format, probabilistic constellation shaping may be applied to the optical signals. In constellation shaping, data bits are mapped and coded into improved constellations that may exhibit improved noise tolerance or increased OSNR. As a result of the improved noise tolerance, the reach of an optical signal in which constellation shaping has been applied may be increased, which is desirable for optical communication using optical transport network 101. In a typical modulation format (such as QPSK or m-QAM), the symbols exhibit a uniform distribution in the complex plane, shown as uniformly distribution constellation points in a constellation diagram. When constellation shaping is applied to a modulation formation, the distribution of the symbols in the complex plane is changed to provide an improved mapping for noise tolerance. In some instances, the distribution of symbols may be a Gaussian or Gaussian-like distribution that is shown as non-uniform constellation points in the constellation diagram (see also FIG. 5B).

As noted above, transmitter 102 may be a universally programmable transceiver for applying different modulation formats, while receiver 112 may include the corresponding functionality for demodulation. Thus, transmitter 102 may support the use of constellation shaping and may be selectively programmed to apply constellation shaping on a per channel basis, while receiver 112 may correspondingly demodulate channels to which a certain kind of constellation shaping has been applied. In various embodiments, transmitter 102 and receiver 112 may include respective mapping/de-mapping functionality, such as within a digital signal processing (DSP) module, to enable implementation of constellation shaping in optical transport network 101. More specifically, in optical transport network 101, constellation shaping may be activated/deactivated as a procedure in network operations on a per channel basis for a given optical path. In this manner, the available spectrum may be flexibly allocated in terms of bandwidth and constellation shaping to meet various traffic demands, based on specific path information (distance, number/type of co-propagating channels, fiber type, and dispersion map), which may be economically desirable. Furthermore, constellation shaping using universal programmable transceivers in optical transport network 101 may provide improvements in reach with the same electronics and optical components that are already available and installed, which may enable a rapid upgrade to implement constellation shaping.

In another example, in operation of optical transport network 101, in order to extend the transmission reach of certain optical signals, symbol rate optimized (SRO) subcarrier multiplexing may be activated. Activating subcarrier multiplexing may include selecting, within the optical transmission system, a specific modulation format and a specific number of subcarriers to achieve the highest spectral efficiency and the longest reach for a particular optical channel. Selection of the number of subcarriers for a given optical channel may be dependent on the optical fiber type, the selected modulation format, and the delivered reach extension, among other considerations.

In at least some embodiments, the method for implementing reach extension may include selecting, from among multiple supported modulation formats, the modulation format with the highest spectral efficiency suitable for an optical channel with a given target distance and a given maximum data rate. The method may also include determining an optimum symbol rate, and a corresponding number of subcarriers for the given optical channel, based at least on the number and length of spans in the optical channel, and fiber characteristics for each fiber type over which traffic is carried in the optical channel. When the optimum number of subcarriers is greater than one, the method may also include activating digital subcarrier multiplexing, which may include configuring transponders associated with the given optical channel to transmit and/or receive optical signals using the selected modulation format and the determined optimum number of subcarriers. For example, the DSPs in the transponders may be controlled by software operating on a central network management system in the optical transmission system to configure them for operation using the selected modulation format and the determined optimum number of subcarriers.

It has been shown that the maximum possible reach extension for a given optical channel is modulation format dependent. For example, the maximum reach extension achievable with DP-16-QAM is much smaller than the maximum reach extension achievable with DP-QPSK. This is illustrated in Table 1 below.

TABLE 1

Example reach extensions for SMF fiber links

| Reach | Fiber type | Ropt | Modulation format | Spectral efficiency per polarization | ΔL |
|---|---|---|---|---|---|
| 2000 km | SMF | 4 GBd | DP-QPSK | 2 bits/symbol | 800 km |
| 750 km | SMF | 6 GBd | DP-8-QAM | 3 bits/symbol | 240 km |
| 400 km | SMF | 8 GBd | DP-16-QAM | 4 bits/symbol | 80 km |

As shown in Table 1, with DP-QPSK, the typical reach with SMF fiber links is 2000 kilometers. The reach extension, ΔL, resulting from the activation of SCM with 8 subcarriers would be approximately 800 kilometers. With DP-8-QAM, the typical reach with SMF fiber links is 750 km. In this case, the reach extension, ΔL, resulting from the activation of SCM with 6 subcarriers would be approximately 240 kilometers. With DP-16-QAM, the typical reach with SMF fiber links is 400 kilometers. The reach extension, ΔL, resulting from the activation of SCM with 4 subcarriers would be approximately 80 kilometers.

As shown in Table 1, DP-QPSK has lower spectral efficiency than DP-8-QAM or DP-16-QAM, where spectral efficiency refers to the amount of information that can be carried in a specific bandwidth. Spectral efficiency is sometimes expressed in terms of bits per second per Hz. For example, DP-QPSK carries only 2 bits per symbol per polarization, while DP-16-QAM carries 4 bits per symbol per polarization. Therefore, by using DP-16-QAM, more information can be packed into a given optical channel than by using DP-QPSK.

As will be described in further detail herein, methods and systems are disclosed for reducing variance in reach of WDM channels in optical transport networks, such as optical transport network 101. For example, signal reach (or OSNR) varies for different WDM channels. In at least some embodiments, the use of one or more reach extension techniques to increase the reach of some, but not all, of the channels in an optical transport network may result in better network utilization and may also reduce complexity in planning, configuration, and reconfiguration of flexible optical networks when compared to existing systems in which each channel is optimized for each particular wavelength and reach distance. For example, rather than assigning channels to specific wavelengths based on a particular reach distance (which might not be known or which might subsequently change), by using the techniques described herein, a channel placed at any wavelength may be able to achieve any target reach. In some embodiments, by applying one or more reach extension techniques only to those channels at the shorter wavelengths within a range of wavelengths supported in an optical transport network, the variance in reach between WDM channels in the optical transport network may be reduced, thus mitigating the effects of the dependency of reach on wavelength. In at least some embodiments, optical transport networks may be optimized to provide at least a target system reach for all WDM channels by extending the reach of optical signals for channels at shorter wavelengths to at least the target reach while refraining from extending the reach of optical signals for channels at longer wavelengths that can achieve the target reach without the application of any reach extension techniques.

In some embodiments, in order to reduce the variance in reach between WDM channels, shorter wavelength channels may be assigned modulation formats with probabilistic constellation shaping. In other embodiments, in order to reduce the variance in reach between WDM channels, shorter wavelength channels may be assigned modulation formats with symbol rate optimized (SRO) subcarrier multiplexing activated. In still other embodiments, in order to reduce the variance in reach between WDM channels, shorter wavelength channels may be assigned modulation formats with probabilistic constellation shaping and with symbol rate optimized (SRO) subcarrier multiplexing activated.

It is known that signal reach (or OSNR) varies for different WDM channels, with signal reach being shorter for short wavelengths and longer for long wavelengths. More specifically, since chromatic dispersion is lower at shorter wavelengths, there is different interaction between fiber Kerr nonlinearity and chromatic dispersion at shorted wavelength. This results in a different impact of nonlinear effects during fiber propagation and, thus, a different reach. This wavelength dependent reach is undesirable for flexible and adaptive optical networks. For example, this wavelength dependent reach makes network planning more complex.

Figure 2A:
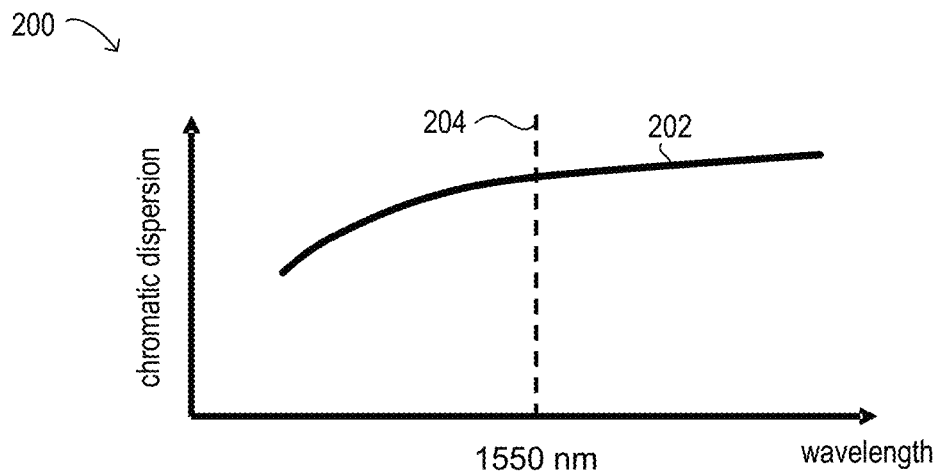
FIGS. 2A and 2B illustrate how signal reach in an optical transport network varies with wavelength.
Figure 2B:
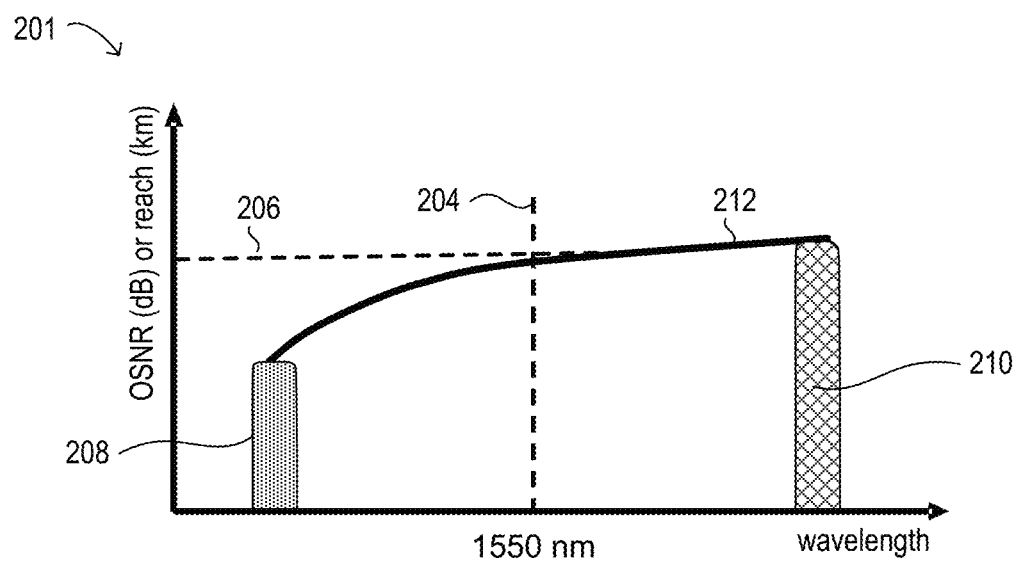

FIGS. 2A and 2B illustrate how signal reach in an optical transport network varies with wavelength. More specifically, FIG. 2A is a plot 200 illustrating, by curve 202, a relationship between chromatic dispersion on the y-axis and wavelength on the x-axis within a range of wavelengths centered around 1550 nm at midpoint 204. For example, chromatic dispersion increases rapidly as wavelength increases at wavelengths less than 1550 nm (e.g., to the left of dashed line 204). However, chromatic dispersion is relatively flat at all wavelengths greater than 1550 nm (e.g., to the right of dashed line 204). Because chromatic dispersion is smaller for shorter wavelengths, the fiber nonlinearity is larger for these wavelengths, meaning that the reach is shorter for these wavelengths.

FIG. 2B is a plot 201 illustrating, by curve 212, a relationship between the wavelength of a WDM channel in an optical network on the x-axis and a corresponding expected or calculated OSNR (dB) or reach (km) for the channel on the y-axis. In the illustrated example, channel 208, which is at a wavelength shorter than 1550 nm, has an OSNR or reach that is much less than the OSNR or reach of channel 210, which is at a wavelength longer than 1550 nm. In this example, the target OSNR or reach for the WDM channels of the optical network is shown as target OSNR/reach 206. This target OSNR/reach 206 is achievable by channel 210, but not by channel 208.

Some existing systems include measures to optimize power across wavelengths by setting different power levels for different wavelengths to reduce the impact of nonlinear effects on the shorter wavelengths. However, by reducing power, OSNR or reach is also reduced. In other existing systems, different paths are assigned to different wavelengths. For example, because channels with longer wavelengths typically have better performance, they might be assigned to longer paths in an optical network while channels with lower performance, such as channels at shorter wavelengths, might be assigned to shorter paths in the optical network. In some existing systems, all of the channels in the optical network are configured based on the performance of the worst-case channel. For example, all of the channels might be configured based on the performance of the channel at the shortest wavelength, where the impact of nonlinearity is highest. In this case, there may be wasted extra margin designed into the channels at higher wavelengths, where the impact of nonlinearity is lower.

In at least some embodiments, the methods and optical transport networks described herein may reduce variance in reach of WDM channels in the networks by extending the reach of optical signals for channels at shorter wavelengths to at least a target reach while refraining from extending the reach of optical signals for channels at longer wavelengths that can achieve the target reach without the application of any reach extension techniques.

Figure 3:
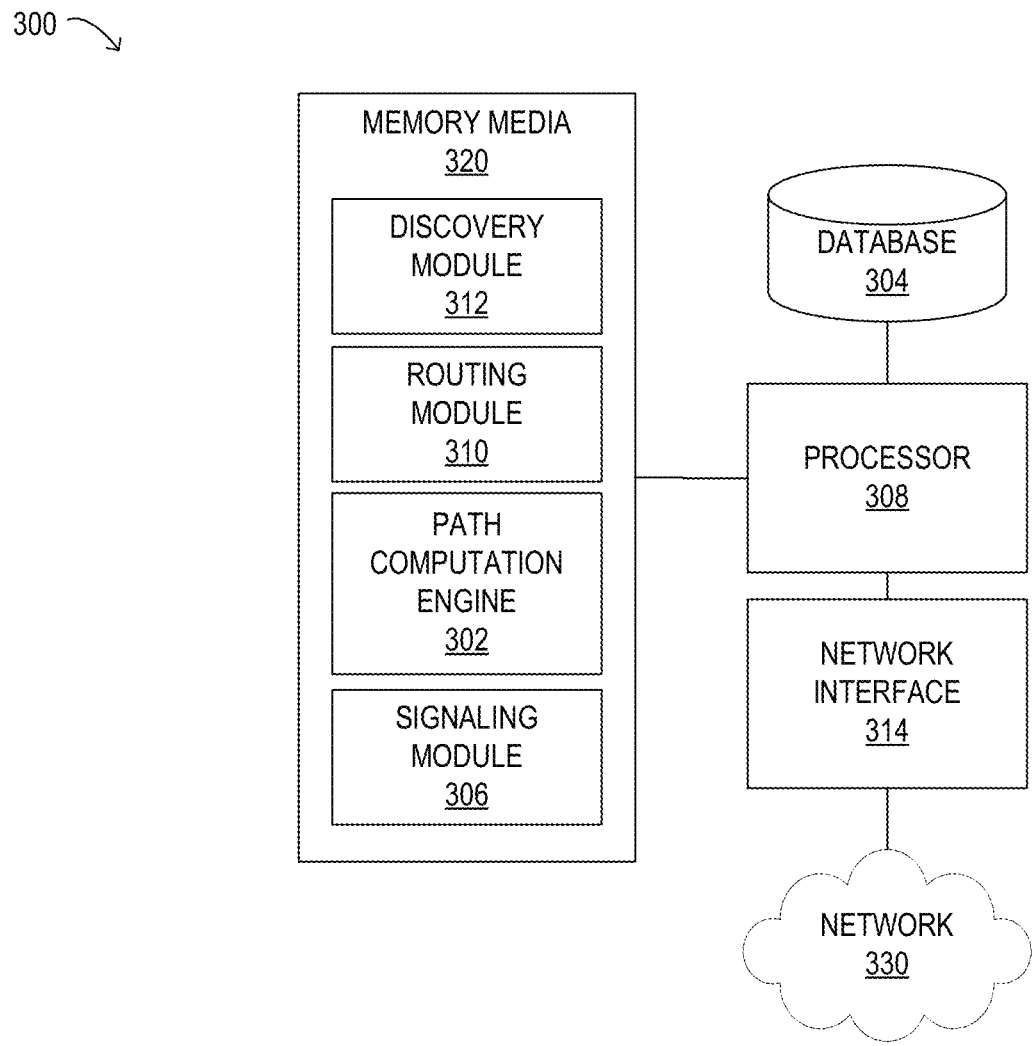
FIG. 3 is a block diagram of selected elements of an embodiment of network management system for implementing control plane functionality in optical networks.

Referring now to FIG. 3, a block diagram of selected elements of an embodiment of network management system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, network management system 300 includes processor 308 and memory media 320, which may store executable instructions (i.e., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312 and routing module 310.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of optical transport network 101. In certain embodiments, network 330 may include at least certain portions of a public network, such as the Internet. Network 330 may be implemented using hardware, software, or various combinations thereof.

In certain embodiments, the control plane may be configured to interface with a person (i.e., a user) and receive data about the signal transmission path. For example, the control plane may also include and/or may be coupled to one or more input devices or output devices to facilitate receiving data about the signal transmission path from the user and outputting results to the user. The one or more input and output devices (not shown) may include, but are not limited to, a keyboard, a mouse, a touchpad, a microphone, a display, a touchscreen display, an audio speaker, or the like. Alternately or additionally, the control plane may be configured to receive data about the signal transmission path from a device such as another computing device or a network element (not shown in FIG. 3), for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 3, routing module 310 may be responsible for propagating link connectivity information to various nodes within an optical network, such as optical transport network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304.

In some embodiments, database 304 may be populated with information indicating a respective reach (and/or an achievable reach extension) and a respective spectral efficiency for WDM channels at particular wavelengths and with particular combinations of modulation formats, symbol rates, and numbers of subcarriers, with and without probabilistic constellation shaping of particular types. In some embodiments, network management system 300 may be configured to determine, based on the information in the database, particular combinations of these parameters that can result in a given shorter wavelength channel achieving a target reach selected for all WDM channels in an optical transport network.

In FIG. 3, signaling module 306 may provide functionality associated with setting up, modifying, and tearing down end-to-end networks services in optical transport network 101. For example, when an ingress node in the optical network receives a service request, the control plane may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of network management system 300, after an optical channel has been provisioned, network management system 300 may configure the optical channel to increase the transmission reach of the optical channel. In some embodiments, path computation engine 302, or another element of network management system 300, may be operable to select, within the optical transmission system, a specific modulation format and a specific number of subcarriers to achieve the highest spectral efficiency and the longest reach for the optical channel. Selection of the number of subcarriers for the optical channel may be dependent on the optical fiber type, the selected modulation format, and the delivered reach extension, among other considerations.

In operation of network management system 300, path computation engine 302, or another entity or module, may provide path information associated with a given optical path, such as a distance, a number and type of optical channels to be transmitted, a fiber type, and a dispersion map. For example, signaling module 306, or another entity or module, may receive the path information and may decide on a type of modulation format and whether or not to use constellation shaping for any of the optical channels transmitted over the optical path. In order to activate or deactivate constellation shaping, signaling module 306 may send a first command to each transmitter for each of the optical channels, respectively. Then, signaling module 306 may send a second command to each receiver corresponding to each transmitter to activate or deactivate constellation shaping. Transmitters and receivers having universal programmable transponder functionality may receive the commands from signaling module 306 and may then activate or deactivate transmission of the optical channels using constellation shaping.

In some embodiments, path computation engine 302, or another element of network management system 300, may be operable to reduce variance of reach in multiple WDM channels in an optical transport network by applying one or more reach extension techniques, such as probabilistic constellation shaping and/or symbol rate optimized subcarrier multiplexing, to some, but not all of the WDM channels.

Figure 4:
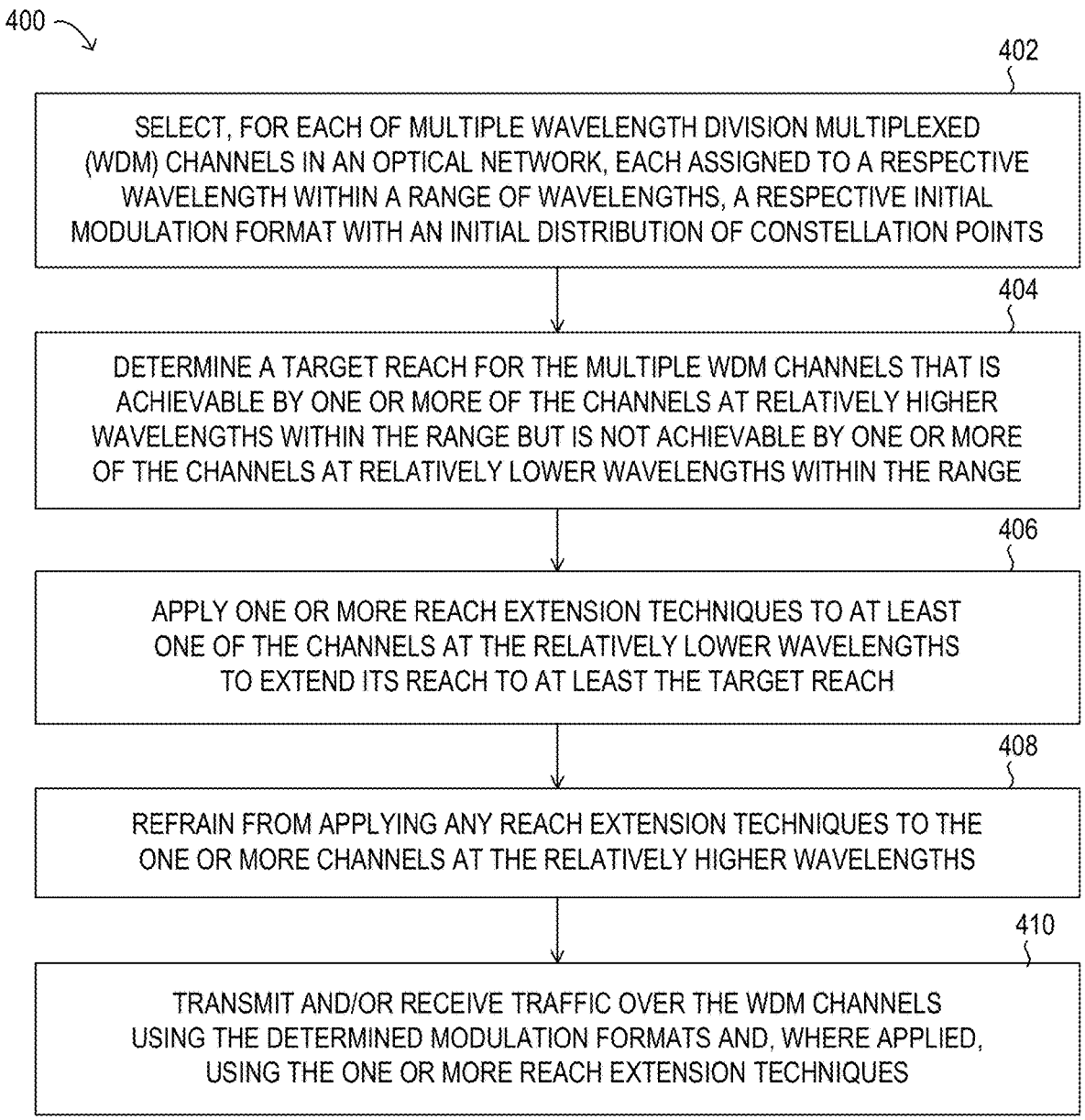
FIG. 4 is a flow diagram of selected elements of an embodiment of a method for reducing variance in reach of WDM channels in optical transport networks.

Referring now to FIG. 4, a block diagram of selected elements of an embodiment of method 400 for reducing variance in reach of WDM channels in optical transport networks, as described herein, is depicted in flowchart form. Method 400 may be performed using optical transport network 101. In some embodiments, method 400 may be performed by path computation engine 302 or another element of network management system 300. It will be understood that operations in method 400 may be repeated or duplicated, either in parallel or in serial, for one or more of the optical channels. It is noted that certain operations described in method 400 may be optional or may be rearranged in different embodiments.

Method 400 may begin at 402 by selecting, for each of multiple wavelength division multiplexed (WDM) channels in an optical network, each assigned to a respective wavelength within a range of wavelengths (e.g., within the C-Band), a respective initial modulation format with an initial distribution of constellation points in the complex plane. The initial distribution of constellation points may be a uniform distribution.

At 404, method 400 may include determining a target reach for the multiple WDM channels that is achievable by one or more of the channels at relatively higher wavelengths within the range using their initially selected modulation formats but is not achievable by one or more of the channels at relatively lower wavelengths within the range using their initially selected modulation formats.

At 406, method 400 may include applying one or more reach extension techniques to at least one of the channels at the relatively lower wavelengths to extend its reach to at least the target reach. At 408, the method may include refraining from applying any reach extension techniques to the one or more channels at the relatively higher wavelengths.

At 410, method 400 may include transmitting and/or receiving traffic over the multiple WDM channels using the determined modulation formats and, where applied, using the one or more reach extension techniques.

As noted above, in some embodiments, in order to reduce the variance in reach between WDM channels, shorter wavelength channels may be assigned modulation formats with probabilistic constellation shaping while no such shaping is applied to longer wavelength channels. Any suitable modulation format may serve as a base modulation format for a channel to which probabilistic constellation shaping is applied. With probabilistic shaping, the constellation points in the complex plane may be shaped in a way that results in additional system gain. In various embodiments, probabilistic shaping can deliver up to a 1.5 dB system gain and may be beneficial for extending the reach of channels at shorter wavelengths within a range of wavelengths to achieve at least a target reach selected for all WDM channels in an optical transport network. In addition to selecting a suitable order format (e.g., a particular m-QAM format) for a channel to which probabilistic shaping is applied, a type of probabilistic shaping (e.g., strong or weak shaping) suitable for a given spectral efficiency may be selected. In general, probabilistic constellation shaping may be considered "weak" when the assignment of probabilities of occurrence to all constellation points on the constellation diagram approaches a uniform probability distribution and a corresponding three-dimensional constellation diagram may appear to be almost flat. In this case, very few constellation points may be disregarded. By contrast, probabilistic constellation shaping may be considered "strong" when the constellation points located at or near the center of the constellation diagram are assigned much larger probabilities than the probabilities assigned to constellation points farther from the center of the constellation diagram (e.g., at or near the edge of the constellation diagram). In this case, a corresponding three-dimensional constellation diagram may include a visibly prominent peak at its center, and a large number of constellation points near the edge of the constellation diagram may be disregarded.

In one example, for a relatively high order modulation format, such as 64-QAM (which has 6 bits per symbol per polarization), probabilistic constellation shaping may be used to assign a higher probability of occurrence for inner constellation points and a lower probability of occurrence for outer constellation points. Because of the reassignment of the probability, the entropy, or the spectral efficiency, that can be delivered is smaller than for 64-QAM without probabilistic constellation shaping (e.g., with a uniform distribution of constellation points in the complex plane). For example, the entropy resulting from the shaping may be on the order of four bits per symbol per polarization, which is similar to the performance of 16-QAM. In this example, by probabilistically shaping 64-QAM, a system gain may be realized compared to 16-QAM for the same entropy.

In some embodiments, constellation shaping may involve superposition mapping, as described in Equation 1.

$$y = y_I + jy_Q = \sum_{n=1}^{N} e^{j\pi b_n} h_n \qquad \text{Equation (1)}$$

In Equation 1:
y is the optical signal comprised of modulated symbols;
$y_I$ and $y_Q$ are the in-phase (real) and quadrature (imaginary) quadrature components;
N is the number of bits per symbol;
$b_n$ are the encoded binary bits; and
$h_n$ represents a weighted symbol mapping scheme, given by $h_n = \alpha_n e^{j\theta_n}$, where $\alpha_n$ is an amplitude power factor and $\theta_n$ is a phase power factor.

Thus, $h_n$ allocates a certain amplitude and phase to each symbol. By tuning the amplitude power factor $\alpha_n$ and the phase power factor $\theta_n$, different superposition mapping schemes can be implemented. For example, in superposition coded mapping using phase-shifted modulation (PSM), the amplitude power factor $\alpha_n$ is kept constant and the phase power factor $\theta_n$ is uniformly distributed in the complex plane. Additionally, different encoding schemes may be applied prior to superposition mapping, such as superposition coded mapping using bit-interleaved coded modulation. It is noted that when superposition mapping is used in a non-bijective (many-to-one) mapping, decoding and de-mapping at the receiver may involve iterative operations.

In addition to superposition mapping, which is a type of geometric shaping, other constellation shaping techniques include iterative polar modulation (IPM) and low-density parity check coded modulation with probabilistic shaping.

Figure 5A:
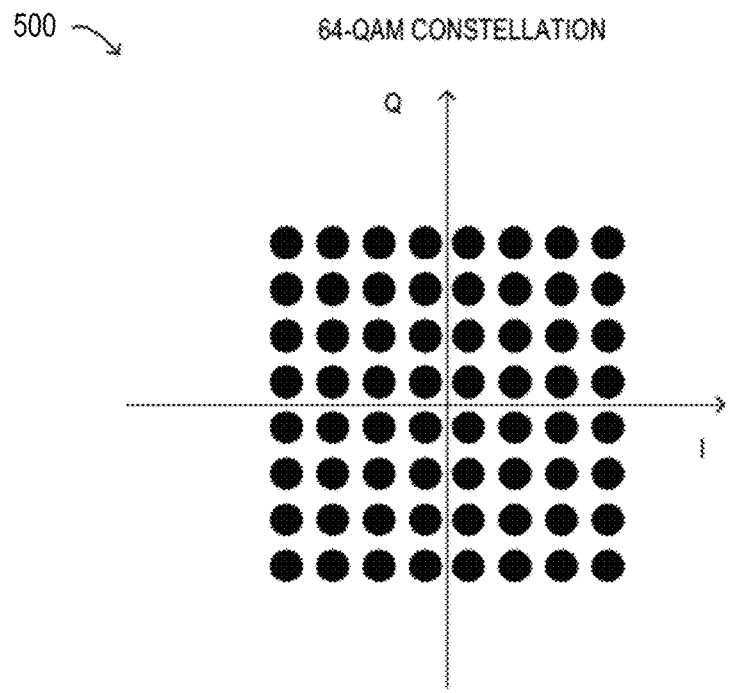
FIGS. 5A-5C illustrate selected elements of constellation diagrams in the complex plane, according to some embodiments.
Figure 5B:
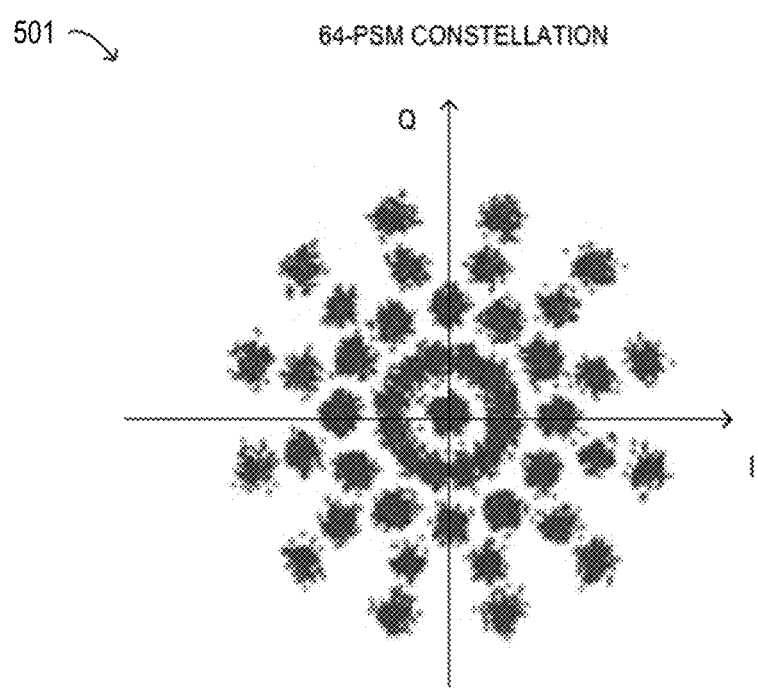
Figure 5C:
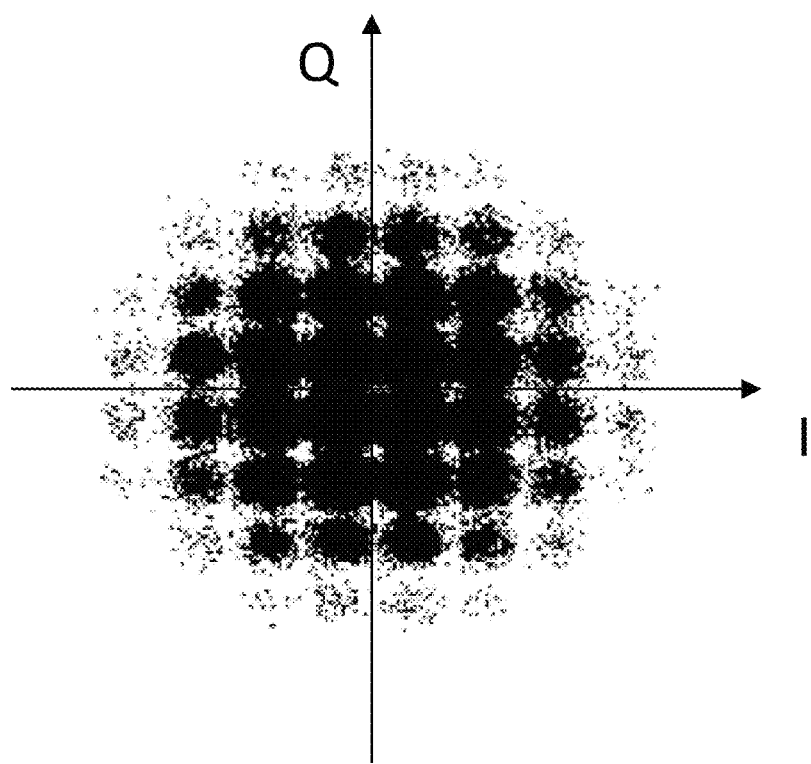

Referring now to FIGS. 5A-5C, selected elements of constellation diagrams in the complex plane are shown according to at least one embodiment. In constellation diagram 500 shown in FIG. 5A, a 64-QAM constellation is shown having a uniform distribution of the constellation points. In constellation diagram 501 shown in FIG. 5B, a 64-PSM constellation is shown having a non-uniform distribution of constellation points as an example of geometric shaping, as disclosed herein. In certain embodiments, the 64-PSM constellation has a Gaussian-like distribution of the constellation points. It is noted that 64-PSM, as shown in constellation diagram 501, may exhibit a shaping gain in OSNR of up to 0.5 dB as compared to 64-QAM, as shown in constellation diagram 500. As a result of the shaping gain, the maximum reach of channels using 64-PSM, as compared to 64-QAM, may be increased. Constellation diagram 502 shown in FIG. 5C illustrates probabilistically shaped 64-QAM (PS-64-QAM), as described above.

In one example of determining a modulation format and whether or not to use constellation shaping, Table 2 lists reach versus modulation format for a given fiber type and optical channel configuration.

TABLE 2

Maximum Reach for Different Modulation Formats

| Modulation Format | Maximum Reach [km] | Maximum shaping gain [dB] |
|---|---|---|
| 64-QAM | 100 km | n/a |
| PS-64-QAM | 112 km | 0.5 dB |
| 16-QAM | 400 km | n/a |
| PS-16-QAM | 430 km | 0.3 dB |

In Table 2, based on a desired reach, a corresponding modulation format that does not exceed the desired reach may be selected. Because PS-64-QAM and PS-16-QAM involve constellation shaping that can be activated or deactivated in the optical network on demand, additional reach due to the shaping gain realized with constellation shaping may be made readily available. Thus, constellation shaping of modulation formats in optical communication systems, as disclosed herein, may provide a flexible method for increasing reach of a given transmission capacity. Without the ability to activate constellation shaping for an optical path, as described herein, conventional methods of increasing the reach, such as using expensive optical-electronic-optical (O-E-O) converters, may be more costly to implement, which is undesirable.

FIG. 6A is a schematic diagram illustrating selected elements of an example embodiment of an optical transmission system 600 configured to apply probabilistic shaping to one or more WDM channels in an optical network. As illustrated in this example, in some embodiments transmission system 600 includes elements similar to those of a conventional transmitter/receiver including, on the transmitter side, data 602, forward error correction (FEC) encoder 606, mapper 608, and optical modulator 610, an optical channel 612 comprising a suitable transmission media, and, on the receiver side, coherent receiver and DSP element 614, de-mapper 616, and FEC decoder 618.

In order to apply probabilistic shaping, transmission system 600 also includes matcher 604 on the transmitter side and de-matcher 620 on the receiver side. The matcher may ensure that the center constellation points have a higher probability of occurrence than the edge constellation points. For example, matcher 604 may be configured to control the probability of occurrence of certain constellation points on the transmitter side to shape the distribution of the constellation points, and de-matcher 620 may be configured to reverse the probabilistic shaping process.

FIG. 6B illustrates selected elements of an embodiment of coherent receiver and DSP element 614. As illustrated in this example, in some embodiments, coherent receiver and DSP element 614 includes elements similar to those of a conventional coherent receiver including I/Q imbalance compensation element 622, chromatic dispersion compensation element 624, polarization de-multiplexer 626, frequency offset compensation element 628, and carrier phase recovery element 630.

In one example, probabilistic constellation shaping may be applied in a transponder configured to transmit an optical signal using 64-QAM. By apply probabilistic shaping, the spectral efficiency can vary from 64-QAM to QPSK (e.g., from 6 bits per symbol per polarization to 2 bits per symbol per polarization) with very fine tuning. In some embodiments, the spectral efficiency may be varied in increments of less than one bit per symbol. For example, instead of the spectral efficiency being configurable with values of just 6 or 5 bits per symbol, the spectral efficiency may be configurable with values of 5.1, 5.5, or 5.9 bits per symbol, as an example. In some embodiments, using matcher 604 and de-matcher 620, one transponder may be able to cover the whole spectral range.

FIGS. 7A through 7D illustrate the use of probabilistic constellation shaping to extend signal reach for WDM channels of an optical transport network at shorter wavelengths only, thus reducing variance in reach of the WDM channels of the optical transport network, according to some embodiments. More specifically, FIG. 7A is a plot 700 illustrating, by curve 712, the relationships between the respective wavelengths within a range of wavelengths (e.g., within the C-band) of several WDM channels in an optical network on the x-axis and corresponding expected or calculated reaches (km) for the channels on the y-axis prior to the application of any reach extension techniques. In the illustrated example, channels 708 and 714, which are at wavelengths shorter than 1550 nm (at midpoint 704), have respective reaches that are much less than the reach of channel 710, which is at a wavelength longer than 1550 nm.

In this example, the target reach for the WDM channels of the optical network is shown as target reach 706. This target reach 706 is achievable by channel 710, but not by channel 708 or by channel 714. In some embodiments, the target reach 706 may be determined based on the calculated reach achievable by a channel at midpoint 704 or at another point within a center portion of the range of wavelengths. Some or all channels assigned to wavelengths in an upper portion of the range of wavelengths (e.g., wavelengths longer than the wavelength at midpoint 704) may be able to achieve the target reach without the application of any reach extension techniques, while some or all channels assigned to wavelengths in a lower portion of the range of wavelengths (e.g., wavelengths shorter than the wavelength at midpoint 704) might not be able to achieve the target reach as originally configured.

In the illustrated example, all of the WDM channels in the optical transport network are initially assigned a modulation format of DP-16-QAM with a uniform distribution of constellation points in the complex plane. FIG. 7B illustrates a constellation diagram with a uniform distribution of constellation points, corresponding to each of the channels 708, 714, and 710 prior to the application of any reach extension techniques.

FIG. 7C is a plot 701 illustrating, by curve 722, the relationships between the respective wavelengths of the WDM channels 708, 714, and 710 and corresponding expected or calculated reaches (km) for the channels subsequent to the application of probabilistic constellation shaping to channels 708 and 714 reach extension techniques. In the illustrated example, applying probabilistic constellation shaping to channels 708 and 714 includes selecting a higher order modulation format for these channels. In this case, the resulting modulation format is DP-PS-64-QAM (where the term "PS" refers to the application of probabilistic shaping) with a spectral efficiency of 4 bits per symbol per polarization.

In the illustrated example, the application of probabilistic constellation shaping to channel 708 results in extending the reach of channel 708 by a gain amount shown as 718. This increase in the reach of channel 708 is sufficient to allow channel 708 to achieve the target reach 706. Similarly, the application of probabilistic constellation shaping to channel 714 results in extending the reach of channel 714 by a gain amount shown as 724. This increase in the reach of channel 714 is sufficient to allow channel 714 to achieve the target reach 706. Since no reach extension techniques were applied to channel 710, there is no change to the reach of channel 710 following the application of probabilistic constellation shaping to channels 708 and 714. In this example, the gain amount needed for channel 708 to achieve target reach 706, shown as 718, may be less than the gain achieved by the application of probabilistic constellation shaping, resulting in some margin in the reach of channel 708. Similarly, the gain amount needed for channel 714 to achieve target reach 706, shown as 724, may be less than the gain achieved by the application of probabilistic constellation shaping, resulting in some margin in the reach of channel 714.

FIG. 7D illustrates a constellation diagram with a non-uniform distribution of constellation points corresponding to each of the channels 708 and 714 subsequent to the application of probabilistic constellation shaping to these channels. The constellation diagram shown in FIG. 7D includes the same number of constellation points as the constellation diagram in FIG. 7B. In this example, channels 708 and 714 are configured for probabilistically-shaped 64-QAM, which may yield the same performance of four bits per symbol per polarization as 16-QAM without probabilistic constellation shaping. However, in FIG. 7D, the center constellation points are brighter than the edge constellation points because the probability of occurrence of those center constellation points has been made higher than the probability of the edge constellation points. As a result of the shaping, a lot of energy is concentrated at the center of the constellation, and the system gain, which may be the same for channels 708 and 714, comes from the lower energy points. Note that since probabilistic constellation shaping was not applied to channel 710, the distribution of constellation points for channel 710 remains uniform, as in FIG. 7B.

While the example illustrated in FIGS. 7A through 7D includes one channel 710 that is able to achieve the target reach as previously configured and two channels 708 and 714 that are not able to achieve the target reach as previously configured, in other embodiments any number of channels assigned to wavelengths at the upper end of the range of wavelengths supported in the optical transport network (e.g., to the right of midpoint 704 in the range of wavelengths illustrated in FIG. 7A) may be able to achieve the target reach without the application of any reach extension techniques and any number of channels assigned to wavelengths at the lower end of the range of wavelengths (e.g., to the left of midpoint 704 in the range of wavelengths illustrated in FIG. 7A) might not be able to achieve the target reach without the application of one or more reach extension techniques.

In the illustrated example in FIG. 7C, the base modulation format of 64-QAM was shaped using probabilistic constellation shaping to extend the reach of channels 708 and 714 while retaining the same spectral efficiency of four bits per symbol per polarization as the 16-QAM modulation format. In various embodiments, this may be achieved with probabilistically shaped 32-QAM, with probabilistically shaped 128 QAM, and with higher order formats, with slightly different gains. In another example, to achieve the same spectral efficiency of two bits per symbol per polarization of the QPSK modulation format, probabilistically shaped 16-QAM may provide sufficient gain to achieve a target reach in some cases, although probabilistically shaped 64-QAM may provide additional margin. In some embodiments, the application of probabilistic constellation shaping may allow the reach of a channel at a relatively short wavelength to approach the Shannon capacity limit for the channel. In various embodiments, probabilistic constellation shaping may be optimized with OSNR for a given base modulation format (e.g., a base m-QAM format) as in the following examples:

A base modulation format of DP-128-QAM (14 bits/symbol with dual polarization) may be shaped as PS-DP-128-QAM to yield the same spectral efficiency as DP-64-QAM (12 bits/symbol with dual polarization) with a $\Delta$SNR of up to 1.5 dB.

A base modulation format of DP-64-QAM (12 bits/symbol with dual polarization) may be shaped as PS-DP-64-QAM to yield the same spectral efficiency as DP-16-QAM (8 bits/symbol with dual polarization) with a $\Delta$SNR of slightly less than 1.5 dB.

As noted above, in some embodiments, applying probabilistic constellation shaping may include selecting a type of probabilistic shaping for the shaping (e.g., a strong shaping or a weak shaping) suitable for a given spectral efficiency target for the channel. Within a range of shaping options, there may be an optimal shaping for the channel dependent on the target spectral efficiency for the channel although multiple ones of the shaping options may provide a sufficient reach extension to achieve a target reach. In one example, if the base modulation format is 1024-QAM, which includes a large number of constellation points, probabilistic constellation shaping may be applied to reach a spectral efficiency of two bits per symbol per polarization, which is similar to the spectral efficiency of QPSK. In this case, where a large number of constellation points may be disregarded, the probabilistic constellation shaping may be referred to as "strong." Alternatively, a base modulation format of 1024-QAM may be shaped to reach a spectral efficiency similar to that of 512-QAM, for example. In this case, the number of constellation points disregarded may be much lower than in the strong shaping case, and the probabilistic constellation shaping may be referred to as "weak." In one example, 50% or more of the constellation points may be disregarded as a result of strong shaping, while fewer than 20% of the constellation points may be disregarded as a result of weak shaping.

As noted above, in some embodiments, in order to reduce the variance in reach between WDM channels, shorter wavelength channels may be assigned modulation formats with symbol rate optimized (SRO) subcarrier multiplexing activated, while SRO subcarrier multiplexing is not activated for longer wavelength channels. In single carrier situations, a single carrier signal may be generated by a single transmitter. As described in more detail below, in multi-carrier situations, a signal generated by a single transmitter may be electrically split into multiple subcarriers, using digital signal processes. In some embodiments, SRO-SCM signals may have a higher tolerance to fiber nonlinearity.

Referring to FIG. 8, selected embodiments of an optical channel are shown as power spectra 800, which depicts five (5) spectra for respective single carrier and multi-carrier channels. For example, a single carrier signal may be generated by a single transmitter. A multi-carrier signal may be generated by a single transmitter where it is electrically (e.g., in a DSP) split into a given number of subcarriers. Spectra 800 are shown in a schematic representation that is not drawn to scale. Specifically, spectrum 800-1 shows a single carrier channel having a bandwidth BW. When the bandwidth is 35 GHz, for example, the single channel in spectrum 800-1 may have a 32 Gbaud symbol rate. Spectrum 800-2 shows a multi-carrier channel having two subcarriers. When the bandwidth is 35 GHz, each of the subcarriers in spectrum 800-2 may have a 16 Gbaud symbol rate. Spectrum 800-3 shows a multi-carrier channel having four subcarriers. When the bandwidth is 35 GHz, each of the subcarriers in spectrum 800-3 may have an 8 Gbaud symbol rate. Spectrum 800-4 shows a multi-carrier channel having eight subcarriers. When the bandwidth is 35 GHz, each of the subcarriers in spectrum 800-4 may have a 4 Gbaud symbol rate. Spectrum 800-5 shows a multi-carrier channel having sixteen subcarriers. When the bandwidth is 35 GHz, each of the subcarriers in spectrum 800-5 may have a 2 Gbaud symbol rate. The multi-carrier channels may be generated using a single transmitter with a DSP that can split the optical channel into the desired number of subcarriers. It is noted that the channel bandwidth BW and the optical power remains the same for the optical channel, whether transmitted as a single carrier channel or as a multi-carrier channel.

The nonlinear interactions between subcarriers of a multi-carrier channel may include phenomena such as cross-phase modulation (XPM), self-phase modulation (SPM), and four-wave mixing, among others. Cross-phase modulation may occur when phase information, amplitude information, or both from one subcarrier is modulated to an adjacent subcarrier in the multi-carrier channel. Self-phase modulation may arise when a variation in the refractive index (or a dependency of the refractive index on intensity) results in a phase shift within each subcarrier. In four-wave mixing (FWM), three wavelengths may interact to create a fourth wavelength that may coincide with a wavelength of a subcarrier, and may lead to undesirable variations in peak power or other types of signal distortion on the affected subcarrier. Furthermore, nonlinear cross-talk may comprise inter-subcarrier components. Since nonlinear interactions occur during fiber transmission and may not depend on a degree of overlap of the subcarrier frequency bands, Nyquist pulse shaping may be ineffective in resolving certain problems with nonlinear cross-talk in a multi-carrier channel. In some embodiments, by sub-dividing a single high symbol rate channel into multiple low symbol rate subcarriers, the impact of SPM and/or XPM may be significantly reduced. However, FWM may increase as the number of subcarriers increases. Thus, an optimum number of subcarriers, and a corresponding optimum symbol rate, may exist such that the total penalty due to fiber nonlinearity is minimized, which may enable increased transmission reach.

In particular embodiments, more than one multi-carrier channel may be transmitted simultaneously. For example, any of the multi-carrier channels shown in FIG. 2 may be transmitted along with another multi-carrier channel. In this case, a guard band may be applied between the first multi-carrier channel and the second multi-carrier channel to mitigate nonlinear interactions in the fiber.

Figure 9A:
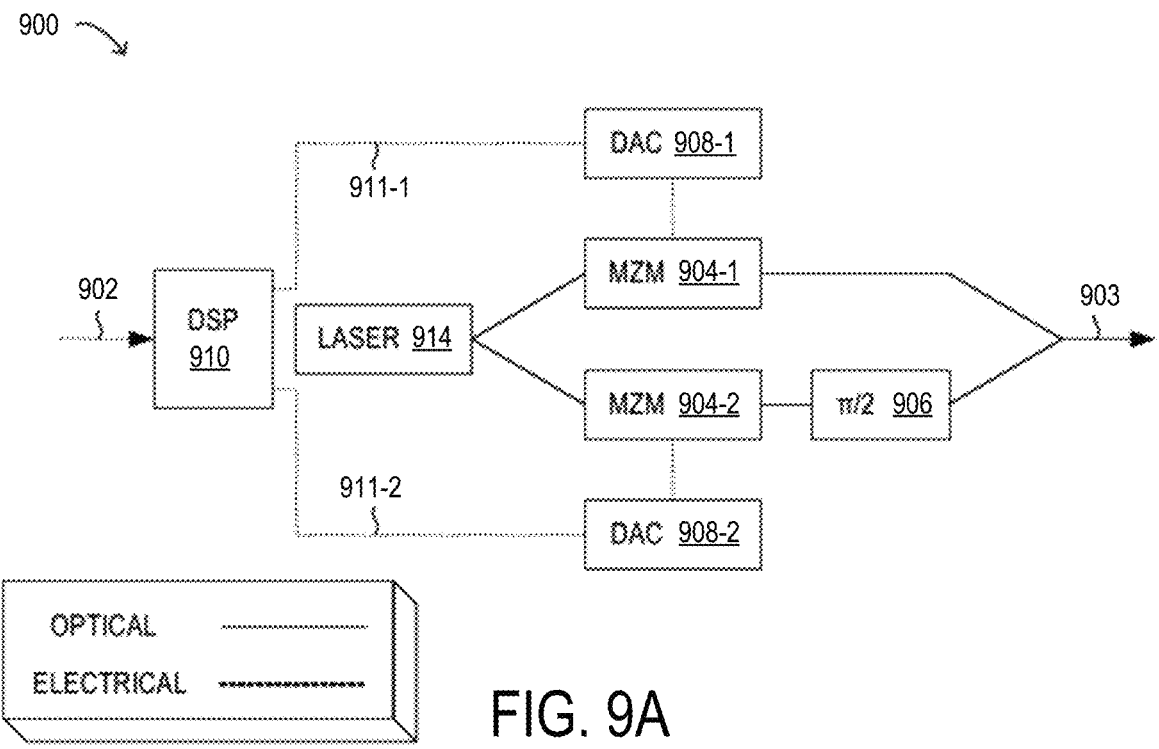
FIG. 9A is a block diagram of selected elements of an embodiment of an optical IQ transmitter.

Referring now to FIG. 9A, a block diagram of selected elements of an embodiment of an optical IQ transmitter 900 is shown. Transmitter 900 may be an embodiment of transmitter 102 in FIG. 1. Transmitter 900 is a schematic representation and is not drawn to scale. In various embodiments, transmitter 900 may be implemented with fewer or more elements than depicted. Dashed lines in FIG. 9A represent electrical signals, including digital data logically represented by electrical signals, while solid lines represent optical signals.

As shown, transmitter 900 may receive data 902 as an input signal for transmission at digital signal processor (DSP) 910, which may include (or have access to) a memory storing instructions executable by DSP 910. DSP 910 may generate real (I) portion 911-1 and imaginary (Q) portion 911-2 of the data 902 for optical modulation that are converted to analog signals by digital to analog converters (DAC). As shown, transmitter 900 includes Mach-Zehnder modulators (MZM) 904 that perform amplitude modulation using laser 914 as an optical source. Specifically, real (I) portion 911-1 is converted from digital data to an analog modulation signal by DAC 908-1 that is fed to MZM 904-1. At the same time, imaginary (Q) portion 911-2 is converted from digital data to an analog modulation signal by DAC 908-2 that is fed to MZM 904-2. After applying a $\pi/2$ phase shift 906 to the output of MZM 904-2, the optical signals are combined to generate optical signal 903.

Figure 9B:
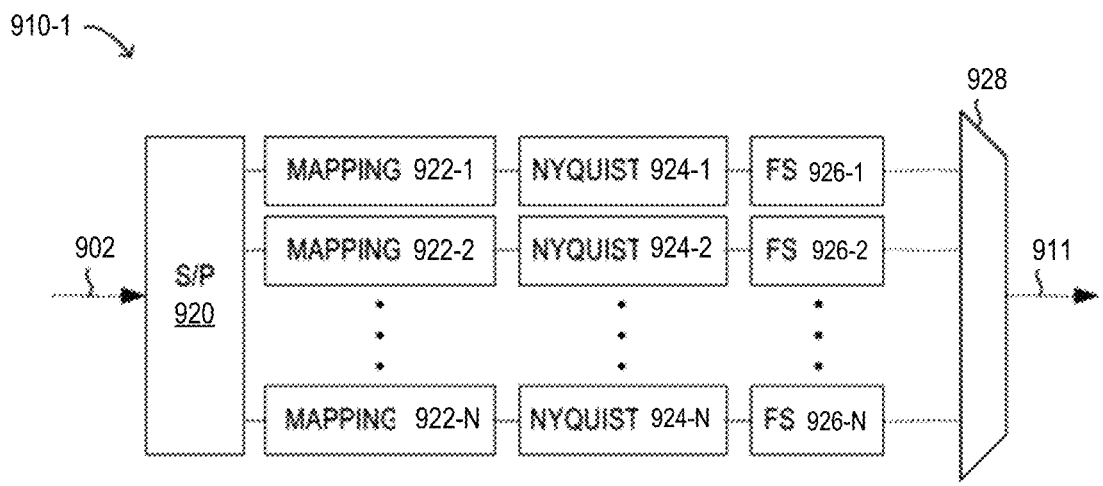
FIG. 9B is a block diagram of selected elements of an embodiment of a DSP in a transmitter.

In FIG. 9B, further details of an embodiment of DSP 910-1 are shown. DSP 910-1 may receive data 902 and then may perform serial-to-parallel conversion (S/P) 920 on data 902, such that each subcarrier portion of data 902, from 1 to N subcarriers, is subsequently processed in parallel. It is noted that in some embodiments, DSP 910-1 may include a field-programmable gate array (FPGA) for performing at least some of the functionality described herein. For each subcarrier 1 to N, DSP 910-1 may then perform symbol mapping 922 and Nyquist filtering 924 before frequency shifting (FS) 926 is applied. Then, at subcarrier multiplexer 928, the individual subcarrier data are combined into signal portion 911, which may be either real (I) portion 911-1 or imaginary (Q) portion 911-2.

Figure 10A:
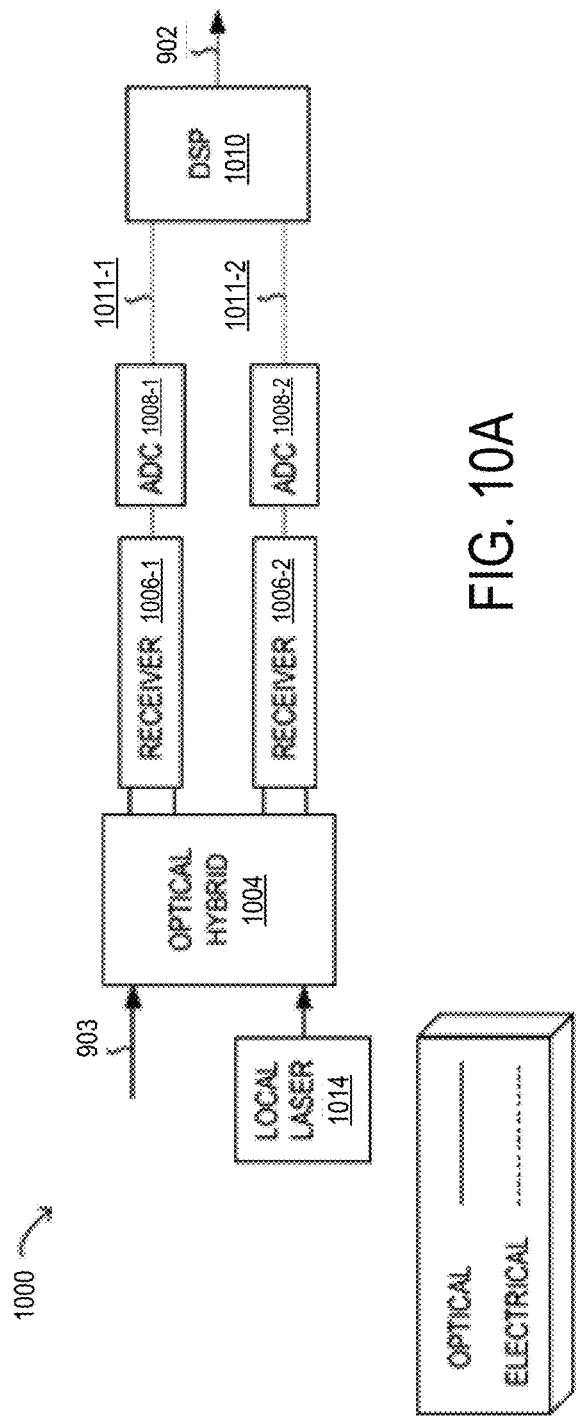
FIG. 10A is a block diagram of selected elements of an embodiment of an optical IQ receiver.

Referring now to FIG. 10A, a block diagram of selected elements of an embodiment of an optical IQ receiver 1000 is shown. Receiver 1000 may be an embodiment of receiver 112 in FIG. 1. Receiver 1000 is a schematic representation and is not drawn to scale. In various embodiments, receiver 1000 may be implemented with fewer or more elements than depicted. Dashed lines in FIG. 10A represent electrical signals, including digital data logically represented by electrical signals, while solid lines represent optical signals.

As shown in FIG. 10A, receiver 1000 may receive optical signal 903 as input, for example, after transmission in an optical network. Optical signal 903 along with a local laser 1014 may be received at optical hybrid 1004. Optical hybrid 1004 may be a 90° optical hybrid that mixes optical signal 903 into four quadrature states with local laser 1014 used as a reference signal. The respective outputs of optical hybrid 1004 may be fed as a real component to receiver 1006-1 and as an imaginary component to receiver 1006-2. Receivers 1006 may be balanced receivers that perform coherent signal demodulation and also may perform optical power monitoring. After digitization by ADCs 1008-1 and 1008-2 respectively, DSP 1010 receives real signal portion 1011-1 and imaginary signal portion 1011-2 of optical signal 903. DSP 1010 may be used to extract the amplitude and phase information for each subcarrier to regenerate data 902. After data 902 is generated, a BER may be calculated.

Figure 10B:
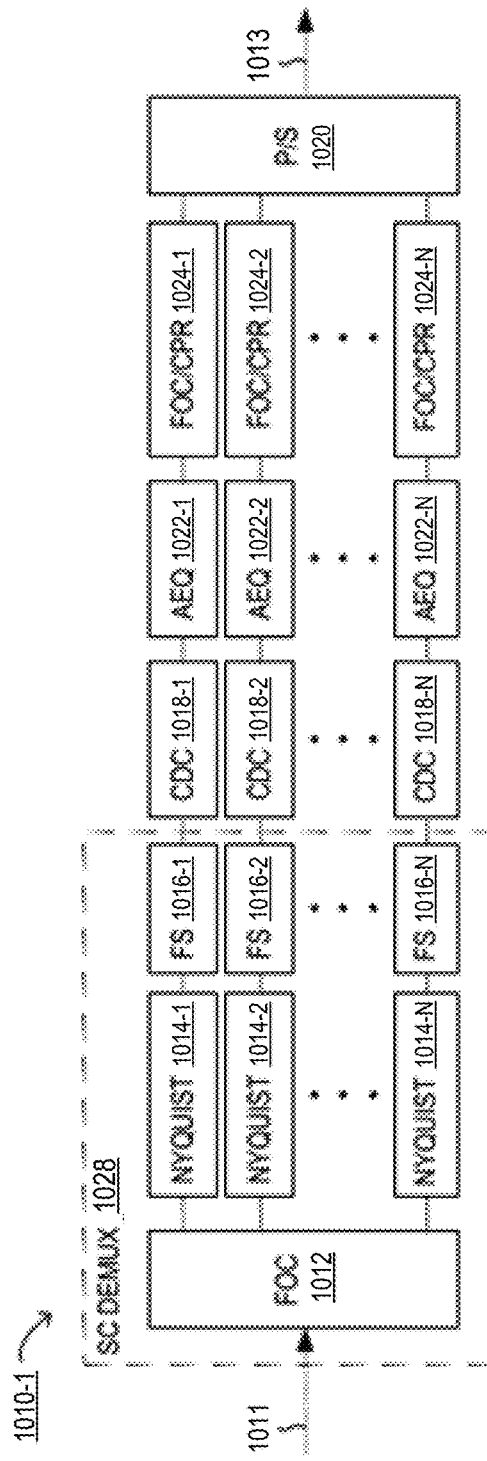
FIG. 10B is a block diagram of selected elements of an embodiment of a DSP in a receiver.

In FIG. 10B, further details of an embodiment of DSP 1010-1 are shown. DSP 1010-1 may receive signal portion 1011 and then may perform frequency offset compensation 1012 on signal portion 1011, such that each subcarrier portion of signal portion 1011, from 1 to N subcarriers, is subsequently processed in parallel. It is noted that in some embodiments, DSP 1010-1 may include a field-programmable gate array (FPGA) for performing at least some of the functionality described herein. For each subcarrier 1 to N, DSP 1010-1 may then perform Nyquist filtering 1014 before frequency shifting (FS) 1016 is applied. FOC 1012, Nyquist filtering 1014 and FS 1016 may represent a subcarrier demultiplexer 1028. Then, for each subcarrier 1 to N, chromatic dispersion compensation (CDC) 1018 may be performed, followed by a constant modulus algorithm (CMA)-based adaptive equalization (AEQ) 1022, and followed by FOC/carrier phase recovery (CPR) 1024. Then, at parallel-to-serial converter 1020, the signal portion 1013, corresponding to one of the real or imaginary portion, is generated. Within DSP 1010, the real and imaginary signal portions 1013 may then be combined to generate data 902.

As illustrated in FIG. 8 and described above, the total optical spectrum of a multi-carrier channel may occupy the same bandwidth as a single carrier channel (e.g., 35 GHz in the example illustrated in FIG. 8). In the example illustrated in FIG. 2, if the single carrier channel represented by optical spectrum 200-1 transmits traffic using QPSK at a symbol rate of 32 Gbaud, the data rate may be 100 Gbit/s. When digital subcarrier multiplexing is activated, each subcarrier will have a lower symbol rate (e.g., a 2 Gbaud symbol rate for each of 16 subcarriers, or an 8 Gbaud symbol rate for each of 4 subcarriers), but the total symbol rate for the optical channel is the same as in the single carrier channel case (32 Gbaud) and the total bandwidth occupied is the same as in the single carrier channel case (35 GHz).

In the illustrated example, the optical network that includes optical channel may include a 32 Gbaud transponder with a transmitter DSP that performs Nyquist pulse shaping, which is largely rectangular pulse shaping. The transmitter DSP may also be operable to generate multi-carrier signals. For example, FIG. 9B illustrates a transmitter DSP 910-1 in which a high data rate signal is split into multiple lower data rate subcarriers on which mapping, Nyquist shaping, and frequency shaping are performed as described above. Similarly, a receiver DSP (such as receiver DSP 1010-1 illustrated in FIG. 10B) splits the high data rate signal it receives into multiple subcarrier signals and processes each subcarrier signal separately. In this way, the optical transport system may see a high data rate signal as one single channel, although it may include multiple subcarrier signals.

Previous research has found that an optimum symbol rate (or baud rate) exists for each optical channel in an optical transmission system and that this optimum symbol rate is dependent primarily on characteristics of the underlying transmission media. More specifically, the optimum symbol rate (baud rate) is dependent on the group velocity dispersion parameter ($\beta_2$) for the optical fiber, the span length ($L_{span}$), and the number of spans ($N_{span}$), as follows:

$$R_{opt} = \sqrt{2} / \sqrt{\pi |\beta_2| L_{span} N_{span}}.$$

In one example, a typical single-mode optical fiber (SMF fiber) may have a fiber dispersion coefficient as follows:

$$D_{fiber} = 16.6 \text{ ps/nm/km}$$

In another example, a non-zero dispersion-shifted fiber (NZ-DSF fiber) may have a much lower fiber dispersion coefficient, as follows:

$$D_{fiber} = 4.4 \text{ ps/nm/km}$$

It has been shown that the optimum symbol rate for an optical channel decreases as the target distance for the optical channel increases. For example, for a target distance of 2,000 kilometers and an SMF fiber, the optimum symbol rate may be 4 Gbaud. However, if the target distance is 4,000 kilometers, the optimum symbol rate for an optical channel carried on an SMF fiber may be approximately 2.7 Gbaud. It has also been shown that the optimum symbol rates for optical channels carried over optical fibers of different types are different for the same target distance. For example, the optimum symbol rate for an optical channel carried over an NZ-DSF fiber at a target distance of 5000 kilometers may be 5.5 Gbaud, while the optimum symbol rate for an optical channel carried over an SMF fiber at the same target distance may be approximately 2.4 Gbaud. The systems and methods described herein may select an appropriate symbol rate for a given optical channel based on the fiber type and the target distance.

As described above, the optimum symbol rate for a given optical channel may be modulation format independent. However, reach extension due to activation of digital subcarrier multiplexing is dependent on modulation format. For example, the maximum possible reach extension for optical channels operating with lower order modulation formats, such as DP-QSPK, is larger than the maximum possible reach extension for optical channels operating with higher order modulation formats, such as DP-16-QAM. In addition, the higher order modulation formats have limited reach in general, regardless of whether digital subcarrier multiplexing is activated. The optimum number of subcarriers for a given optical channel may be dependent on the fiber type, the modulation format, and the delivered reach extension.

In some embodiments, a path computation engine (such as path computation engine 302 illustrated in FIG. 3) or another element of a network management system (such as network management system 300) may be operable to select, for a given optical channel, a suitable modulation format (e.g., one that yields a target spectral efficiency), to determine the optimum symbol rate (and corresponding number of subcarriers) for the selected spectral efficiency, and to send instructions to the transponders for the given optical channel (e.g., to DPSs within the transponders) to activate digital subcarrier multiplexing to extend the reach of the given channel. For example, the transponders may support multiple modulation formats with and without digital subcarrier multiplexing and may be configurable or reconfigurable by the network management system, e.g., during initialization of the optical network and/or during operation of the optical network. In one example, each of the transponders may support QPSK, 8-QAM, and 16-QAM, among other modulation formats, with or without polarization, and may also include the option to implement these modulation formats with subcarrier multiplexing activated. In some embodiments, instructions sent by the network management system to the transponders may indicate the selected modulation format and the specific number of subcarriers to be generated based at least on a target spectral efficiency and the selected modulation format, optimum symbol rate, and target reach.

In some embodiments, the systems and methods described herein may be used to implement flexible and dynamic optical networks, rather than fixed optical networks with large amounts of wasted margin. These flexible and dynamic optical networks may provide multiple optical transmission channels with reduced variance in the reach between channels, all of which achieve at least a target reach, with little or no wasted margin. These networks may be dynamically configured as nodes and links are added to and removed from the network.

FIGS. 11A through 11D illustrate the use of SRO subcarrier multiplexing to extend signal reach for WDM channels of an optical transport network at shorter wavelengths only, thus reducing variance in reach of the WDM channels of the optical transport network, according to some embodiments. More specifically, FIG. 11A is a plot 1100 illustrating, by curve 1112, the relationships between the respective wavelengths within a range of wavelengths (e.g., within the C-Band) of several WDM channels in an optical network on the x-axis and corresponding expected or calculated reaches (km) for the channels on the y-axis prior to the application of any reach extension techniques. In the illustrated example, channels 1108 and 1114, which are at wavelengths shorter than 1550 nm (at midpoint 1104), have respective reaches that are much less than the reach of channel 1110, which is at a wavelength longer than 1550 nm.

In this example, the target reach for the WDM channels of the optical network is shown as target reach 1106. This target reach 1106 is achievable by channel 1110, but not by channel 1108 or by channel 1114. In some embodiments, the target reach 1106 may be determined based on the calculated reach achievable by a channel at midpoint 1104 or at another point within a center portion of the range of wavelengths. Some or all channels assigned to wavelengths in an upper portion of the range of wavelengths (e.g., wavelengths longer than the wavelength at midpoint 1104) may be able to achieve the target reach without the application of any reach extension techniques, while some or all channels assigned to wavelengths in a lower portion of the range of wavelengths (e.g., wavelengths shorter than the wavelength at midpoint 1104) might not be able to achieve the target reach as originally configured.

In the illustrated example, all of the WDM channels in the optical transport network are initially assigned a modulation format of DP-16-QAM without subcarrier multiplexing. FIG. 11B illustrates a power spectrum diagram with a single carrier at all wavelengths. The power spectrum diagram illustrated in FIG. 11B may correspond to each of the channels 1108, 1114, and 1110 prior to the application of any reach extension techniques.

FIG. 11C is a plot 1101 illustrating, by curve 1122, the relationships between the respective wavelengths of the WDM channels 1108, 1114, and 1110 and corresponding expected or calculated reaches (km) for the channels subsequent to the application of SRO subcarrier multiplexing to channels 1108 and 1114 reach extension techniques. In the illustrated example, applying SRO subcarrier multiplexing to channels 1108 and 1114 may include selecting a modulation format and determining a specific number of subcarriers into be generated based at least on a target spectral efficiency and the selected modulation format, optimum symbol rate, and target reach for the channel.

In the illustrated example, the application of SRO subcarrier multiplexing to channel 1108 results in extending the reach of channel 1108 by a gain amount shown as 1118. This increase in the reach of channel 1108 is sufficient to allow channel 1108 to achieve the target reach 1106. Similarly, the application of SRO subcarrier multiplexing to channel 1114 results in extending the reach of channel 1114 by a gain amount shown as 1124. This increase in the reach of channel 1114 is sufficient to allow channel 1114 to achieve the target reach 1106. Since no reach extension techniques were applied to channel 1110, there is no change to the reach of channel 1110 following the application of SRO subcarrier multiplexing to channels 1108 and 1114.

FIG. 11D illustrates a power spectrum diagram for channels 1108 and 1114 subsequent to activating SRO subcarrier multiplexing for these channels. In this example, SRO subcarrier multiplexing, activated in the DSP of a coherent transmitter, has been used to divide each of these channels into multiple low baud rate subcarriers that have higher tolerance for nonlinearity in order to extend their reach to at least the target reach. Note that since SRO subcarrier multiplexing was not applied to channel 1110, the power spectrum diagram for channel 1110 remains as in FIG. 11B.

While the example illustrated in FIGS. 11A through 11D includes one channel 1110 that is able to achieve the target reach as previously configured and two channels 1108 and 1114 that are not able to achieve the target reach as previously configured, in other embodiments any number of channels assigned to wavelengths at the upper end of the range of wavelengths supported in the optical transport network (e.g., to the right of midpoint 1104 in the range of wavelengths illustrated in FIG. 11A) may be able to achieve the target reach without the application of any reach extension techniques and any number of channels assigned to wavelengths at the lower end of the range of wavelengths (e.g., to the left of midpoint 1104 in the range of wavelengths illustrated in FIG. 11A) might not be able to achieve the target reach without the application of one or more reach extension techniques.

Note that if channels 1108 and 1114 were divided into the same number of subcarriers, the reach extension for these channels would be similar, resulting in an extra amount of margin for channel 1114. However, when channel 1108 is divided into a different number of subcarriers than channel 1114, the gains may be different, as shown in FIG. 11C, potentially resulting in less wasted margin. In some embodiments, a channel may be divided into fewer subcarriers than is necessary to achieve the maximum gain if dividing the channel into fewer subcarriers is sufficient to achieve the target reach.

As noted above, in some embodiments, in order to reduce the variance in reach between WDM channels, shorter wavelength channels may be assigned modulation formats with probabilistic constellation shaping and with symbol rate optimized (SRO) subcarrier multiplexing activated. For example, in order to extend the reach for a shorter wavelength channel, probabilistic constellation shaping may be applied and SRO subcarrier multiplexing may be activated following the shaping to increase tolerance to nonlinearities.

FIG. 12A is a schematic diagram illustrating selected elements of an example embodiment of an optical transmission system 1200 configured to apply both probabilistic shaping and SRO subcarrier multiplexing to one or more WDM channels in an optical network. As illustrated in this example, transmission system 1200 includes elements similar to those of transmission system 600 illustrated in FIG. 6A including, on the transmitter side, data 1202, matcher 1204, forward error correction (FEC) encoder 1206, mapper 1208, and optical modulator 1210, an optical channel 1212 comprising a suitable transmission media, and, on the receiver side, coherent receiver and DSP element 1214, de-mapper 1216, FEC decoder 1218, and de-matcher 1220. In order to apply both probabilistic shaping and SRO subcarrier multiplexing, transmission system 1200 also includes, on the transmitter side, Nyquist pulse shaping element 1232 and subcarrier multiplexing (SCM) element 1234.

FIG. 12B illustrates selected elements of an embodiment of coherent receiver and DSP element 1214. As in coherent receiver and DSP element 614 illustrated in FIG. 6B, coherent receiver and DSP element 1214 includes I/Q imbalance compensation element 1222, chromatic dispersion compensation element 1224, polarization de-multiplexer 1226, frequency offset compensation element 1228, and carrier phase recovery element 1230. In the illustrated embodiment, in order to apply both probabilistic shaping and SRO subcarrier multiplexing, coherent receiver and DSP element 1214 also includes subcarrier de-multiplexer 1236.

Figure 13A:
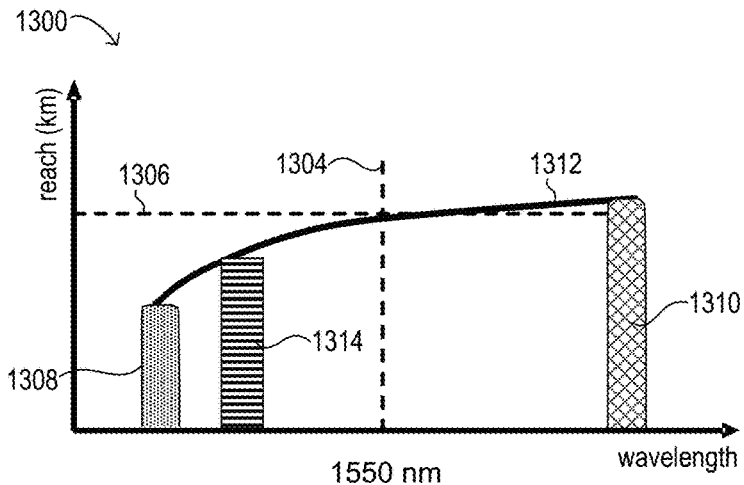
FIGS. 13A through 13D illustrate the use of both probabilistic constellation shaping and SRO subcarrier multiplexing to extend signal reach for WDM channels of an optical transport network to reduce variance in reach, according to some embodiments.

FIGS. 13A through 13D illustrate the use of both probabilistic constellation shaping and SRO subcarrier multiplexing to extend signal reach for WDM channels of an optical transport network at shorter wavelengths only, thus reducing variance in reach of the WDM channels of the optical transport network, according to some embodiments. More specifically, FIG. 13A is a plot 1300 illustrating, by curve 1312, the relationships between the respective wavelengths within a range of wavelengths (e.g., within the C-Band) of several WDM channels in an optical network on the x-axis and corresponding expected or calculated reaches (km) for the channels on the y-axis prior to the application of any reach extension techniques. In the illustrated example, channels 1308 and 1314, which are at wavelengths shorter than 1550 nm (at midpoint 1304), have respective reaches that are much less than the reach of channel 1310, which is at a wavelength longer than 1550 nm.

In this example, the target reach for the WDM channels of the optical network is shown as target reach 1306. This target reach 1306 is achievable by channel 1310, but not by channel 1308 or by channel 1314. In some embodiments, the target reach 1306 may be determined based on the calculated reach achievable by a channel at midpoint 1304 or at another point within a center portion of the range of wavelengths. Some or all channels assigned to wavelengths in an upper portion of the range of wavelengths (e.g., wavelengths longer than the wavelength at midpoint 1304) may be able to achieve the target reach without the application of any reach extension techniques, while some or all channels assigned to wavelengths in a lower portion of the range of wavelengths (e.g., wavelengths shorter than the wavelength at midpoint 1304) might not be able to achieve the target reach as originally configured.

Figure 13B:
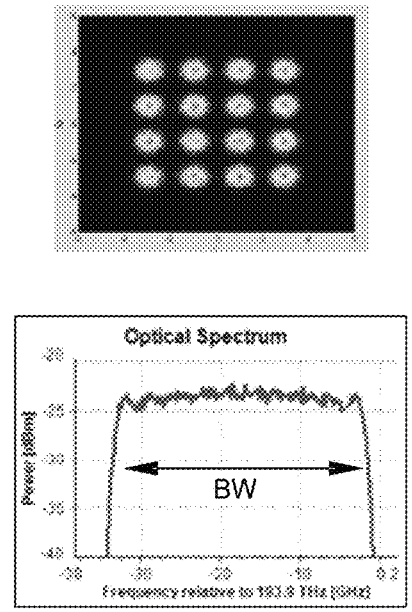

In the illustrated example, all of the WDM channels in the optical transport network are initially assigned a modulation format of DP-16-QAM with a uniform distribution of constellation points in the complex plane. FIG. 13B illustrates a constellation diagram with a uniform distribution of constellation points and a power spectrum diagram with a single carrier at all wavelengths, corresponding to each of the channels 1308, 1314, and 1310 prior to the application of any reach extension techniques.

Figure 13C:
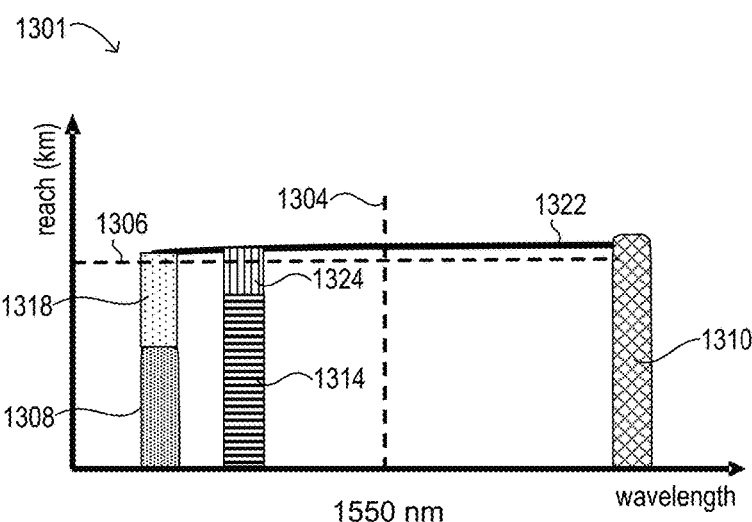

FIG. 13C is a plot 1301 illustrating, by curve 1322, the relationships between the respective wavelengths of the WDM channels 1308, 1314, and 1310 and corresponding expected or calculated reaches (km) for the channels subsequent to the application of probabilistic constellation shaping and SRO subcarrier multiplexing to channels 1308 and 1314 reach extension techniques. In this case, the resulting modulation format is DP-PS-64-QAM (where the term "PS" refers to the application of probabilistic shaping) with a spectral efficiency of 4 bits per symbol per polarization. In the illustrated example, the application of probabilistic constellation shaping and SRO subcarrier multiplexing to channel 1308 results in extending the reach of channel 1308 by a gain amount shown as 1318. This increase in the reach of channel 1308 is sufficient to allow channel 1308 to achieve the target reach 1306. Similarly, the application of probabilistic constellation shaping and SRO subcarrier multiplexing to channel 1314 results in extending the reach of channel 1314 by a gain amount shown as 1324. This increase in the reach of channel 1314 is sufficient to allow channel 1314 to achieve the target reach 1306. Since no reach extension techniques were applied to channel 1310, there is no change to the reach of channel 1310 following the application of probabilistic constellation shaping and SRO subcarrier multiplexing to channels 1308 and 1314.

Figure 13D:
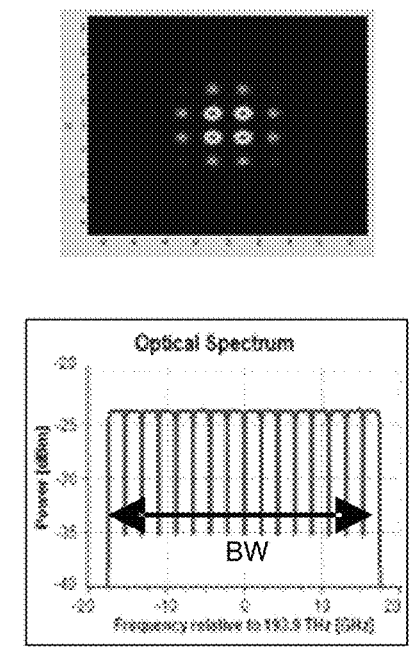

FIG. 13D illustrates a constellation diagram with a non-uniform distribution of constellation points and a power spectrum diagram corresponding to each of the channels 1308 and 1314 subsequent to the application of probabilistic constellation shaping and SRO subcarrier multiplexing to these channels. In this example, SRO subcarrier multiplexing has been activated to divide each of these channels into multiple low baud rate subcarriers that have higher tolerance for nonlinearity. Note that since neither probabilistic constellation shaping nor SRO subcarrier multiplexing was applied to channel 1310, the distribution of constellation points for channel 1310 remains uniform, as in FIG. 13B, and the power spectrum diagram for channel 1310 remains as in FIG. 13B.

While the example illustrated in FIGS. 13A through 13D includes one channel 1310 that is able to achieve the target reach as previously configured and two channels 1308 and 1314 that are not able to achieve the target reach as previously configured, in other embodiments any number of channels assigned to wavelengths at the upper end of the range of wavelengths supported in the optical transport network (e.g., to the right of midpoint 1304 in the range of wavelengths illustrated in FIG. 13A) may be able to achieve the target reach without the application of any reach extension techniques and any number of channels assigned to wavelengths at the lower end of the range of wavelengths (e.g., to the left of midpoint 1304 in the range of wavelengths illustrated in FIG. 13A) might not be able to achieve the target reach without the application of one or more reach extension techniques.

In some embodiments, determining which and/or how many reach extension techniques to apply to a shorter wavelength channel to reduce variance in reach for the WDM channels in an optical transport network may include creating a Gaussian noise model for an optical transport network and using the model to estimate the reach of the shorter wavelengths given known chromatic dispersions and known interactions between optical signals and nonlinearities. For example, the reach of the shorter wavelengths may be pre-calculated using the Gaussian noise model and then stored in a lookup table for subsequent use. In some embodiments, a determination of which and/or how many reach extension techniques to apply to apply to a shorter wavelength channel to reduce variance in reach for the WDM channels in an optical transport system may be based results of a large number of simulations involving various combinations of factors that affect reach extension and spectral efficiency. In one embodiment, a simulator may represent an ultimate transponder that can implement all possible combinations of the factors that affect reach extension and spectral efficiency in an optical transport network. For example, the gain amount achievable when using the probabilistic shaping is at least partially dependent on modulation format but is not necessarily dependent on fiber characteristics of the transmission media. On the other hand, SRO subcarrier multiplexing is essentially independent of modulation format, with the optimal symbol rate depending almost entirely on fiber characteristics and the target reach.

In some embodiments, a database (such as database 304 illustrated in FIG. 3) or lookup table may be populated with information indicating a respective reach (and/or an achievable reach extension) and a respective spectral efficiency for channels at particular wavelengths and with particular combinations of modulation formats, symbol rates, and numbers of subcarriers, with and without probabilistic constellation shaping of particular types (e.g., strong or weak). In some embodiments, a network management system (such as network management system 300) may be configured to determine, based on the information in the database or lookup table, particular combinations of these parameters that can result in a given shorter wavelength channel achieving a target reach selected for all channels in an optical transport network. In one example, once the gains that can be achieved through probabilistic constellation shaping and/or SRO subcarrier multiplexing are known (or calculated), a channel at a specific wavelength may be assigned to a modulation format with probabilistic constellation shaping and/or SRO multiplexing activated to achieve a target reach Referring now to FIG. 14, a block diagram of selected elements of an embodiment of method 1400 for configuring an optical transport network, as described herein, is depicted in flowchart form. Method 1400 may be performed using optical transport network 101. In some embodiments, method 1400 may be performed by path computation engine 302 or another element of network management system 300. It will be understood that operations in method 1400 may be repeated or duplicated, either in parallel or in serial, for one or more of the optical channels. It is noted that certain operations described in method 1400 may be optional or may be rearranged in different embodiments.

Method 1400 may begin at 1402 by assigning multiple WDM channels in an optical network to respective wavelengths within a range of wavelengths (e.g., within the C-Band) and to respective initial modulation formats, including an initial distribution of constellation points in the complex plane. In some embodiments, the same initial modulation format may be selected for all of the WDM channels in the optical network. In other embodiments, different modulation formats may be selected for different ones of the WDM channels in the optical network. In some embodiments, and for at least some WDM channels, the initial modulation format may include a uniform distribution of constellation points in the complex plane. In other embodiments, the initial modulation format assigned to one or more WDM channels may include a distribution of constellation points other than a uniform distribution of constellation points in the complex plane.

At 1404, method 1400 may include determining a target reach for all of the WDM channels based on a reach achievable by at least one of the longest wavelength channels, but not achievable by at least one of the shortest wavelength channels.

At 1406, the method may include, for one of the shortest wavelength channels, applying at least one reach extension technique to extend the reach of the channel to at least the target reach. If, at 1408, the applied extension techniques include probabilistic constellation shaping, method 1400 may continue at 1410. At 1410, method 1400 may include selecting a higher order modulation format for the channel and selecting, based on a target spectral efficiency for the channel, either weak shaping or strong shaping. If probabilistic constellation shaping is not applied (shown as the negative exit from 1408) or following the application of probabilistic constellation shaping at 1410, method 1400 may proceed to 1412.

If, at 1412, the applied extension techniques include SRO subcarrier multiplexing, whether applied alone or in combination with probabilistic constellation shaping (e.g., if the application of probabilistic constellation shaping is not sufficient to extend the reach of the channel to at least the target reach), method 1400 may continue at 1414. Otherwise (e.g., if the application of probabilistic constellation shaping is sufficient to extend the reach of the channel to at least the target reach), method 1400 may proceed to 1416 without the application of SRO subcarrier multiplexing). At 1414, the method may include determining an optimum symbol rate and a corresponding number of subcarriers for the channel based on the target reach and the fiber characteristics of the transmission media for the channel.

At 1416, the method may include configuring one or more transponders for the given optical channel to transmit and/or receive traffic using the determined modulation format, the determined probabilistic shaping technique, and/or the determined optimum symbol rate and corresponding number of subcarriers, as applicable.

If, at 1418, there are more WDM channels assigned to wavelengths that are too short to allow the channels to achieve the target reach, the operations shown as 1406 through 1418 may be repeated for each additional such channel. If, or once, there are no additional channels to which one or more reach extension techniques should be applied to extend their reach to at least the target reach, the configuration of the optical transport network may be complete, as in 1420.

Figure 14:
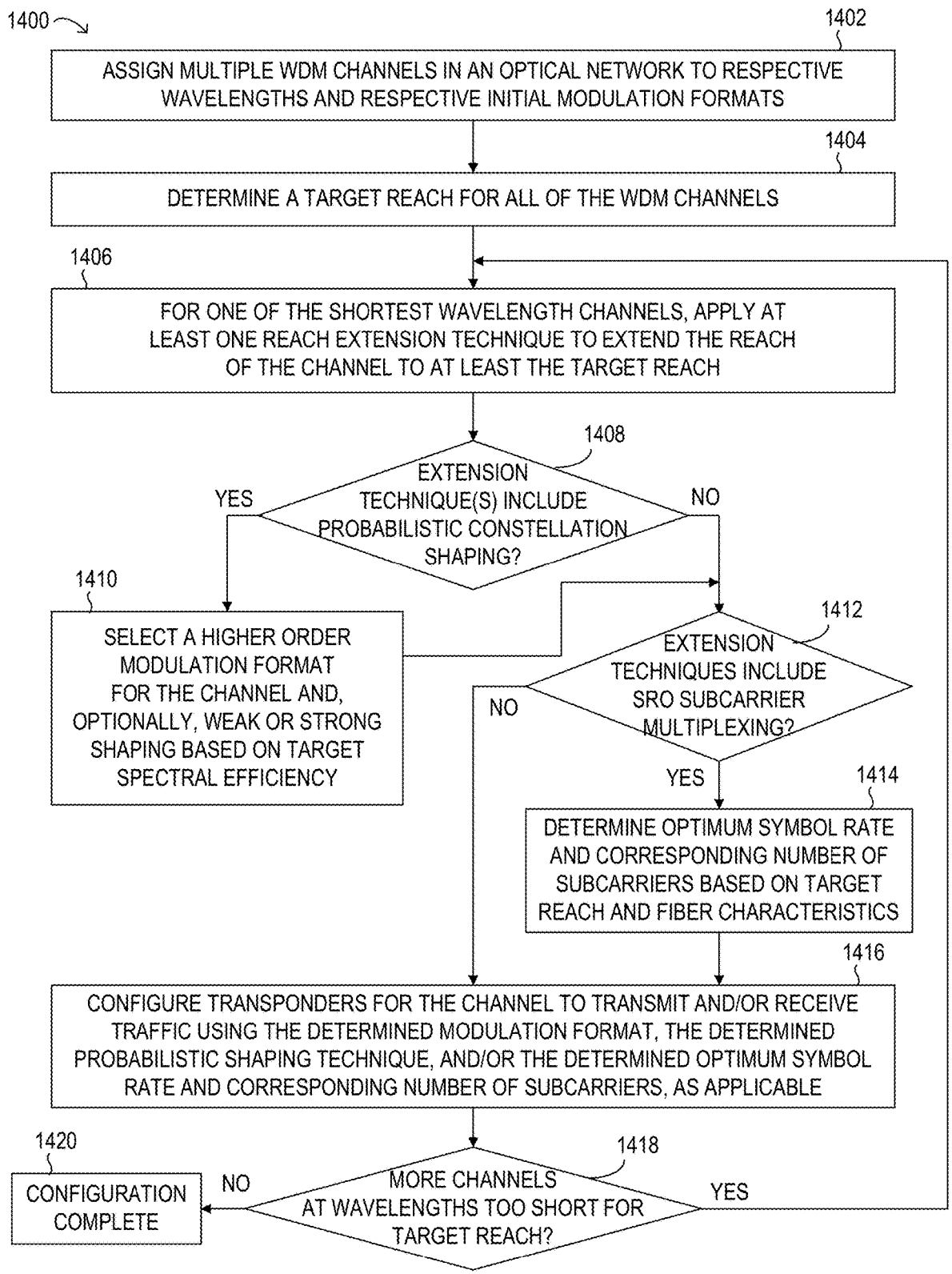
FIG. 14 is a flow diagram of selected elements of an embodiment of method for configuring an optical transport network.

In some embodiments, some or all of the operations illustrated in FIG. 14 may be repeated following configuration changes (e.g., routing changes or changes in equipment or transmission media) in the optical transport network for any WDM channels. In some embodiments, if an additional channel is to be added to an optical transport network, and only a shorter wavelength with the supported range of wavelengths is available for assignment to the additional channel, the techniques described herein may be applied to the additional channel to extend its reach to at least the target reach for all of the WDM channels in the optical transport network.

As described in detail herein, systems and methods for reducing variance in reach of WDM channels in optical transport networks may include selecting, for each channel assigned to a respective wavelength, an initial modulation format and an initial distribution of constellation points in the complex plane, determining a target reach for all WDM channels that is achievable by higher wavelength channels but not by shorter wavelength channels, and applying one or more reach extension techniques to at least one shorter wavelength channel but not to the higher wavelength channels. The reach extension techniques may include probabilistic constellation shaping, symbol rate optimized subcarrier multiplexing, or a combination of the two. Transponders may be configurable to transmit or receive traffic over the WDM channels with or without implementing the reach extension techniques, as applicable. The use of one or more reach extension techniques to increase the reach of some, but not all, of the WDM channels in an optical transport network may result in better network utilization and may also reduce complexity in planning, configuration, and reconfiguration of flexible optical networks when compared to existing systems in which each channel is optimized for a particular wavelength and a particular reach distance.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for reducing variance in reach of wavelength division multiplexed (WDM) channels in optical transport networks, comprising:
    selecting, for each of a plurality of WDM channels in an optical network, each assigned to a respective wavelength within a range of wavelengths, a respective initial modulation format with an initial distribution of constellation points in a complex plane;
    determining a target reach for the plurality of WDM channels that is achievable by one or more WDM channels assigned to wavelengths in an upper portion of the range using their respective initial modulation formats but is not achievable by one or more WDM channels assigned to wavelengths in a lower portion of the range using their respective initial modulation formats, the wavelengths in the lower portion of the range being shorter than the wavelengths in the upper portion of the range;
    applying one or more reach extension techniques to a given one of the one or more WDM channels assigned to wavelengths in the lower portion of the range to extend its reach to at least the target reach;
    refraining from applying reach extension techniques to the one or more WDM channels assigned to wavelengths in the upper portion of the range;
    transmitting or receiving traffic over the given one of the one or more WDM channels assigned to wavelengths in the lower portion of the range using its initial modulation format and using the one or more reach extension techniques applied to the given channel; and
    transmitting or receiving traffic over the one or more WDM channels assigned to wavelengths in the upper portion of the range using their respective initial modulation formats and without using reach extension techniques.

2. The method of claim 1, wherein determining the target reach comprises calculating an expected reach for a channel assigned at a wavelength within a center portion of the range between the upper portion of the range and the lower portion of the range.

3. The method of claim 1, wherein applying the one or more reach extension techniques to the given channel comprises activating symbol rate optimized subcarrier multiplexing for the given channel.

4. The method of claim 3, wherein applying the one or more reach extension techniques to the given channel further comprises:
    selecting, dependent on characteristics of transmission media for the given channel and the target reach, a symbol rate for the given channel; and
    determining, dependent on the selected symbol rate, a number of subcarriers for the given channel.

5. The method of claim 1, further comprising applying one or more reach extension techniques to another one of the one or more WDM channels assigned to wavelengths in the lower portion of the range to extend its reach to at least the target reach.

6. The method of claim 5, wherein at least one of the reach extension techniques applied to the other channel is different than the one or more reach extension techniques applied to the given channel.

7. The method of claim 1, wherein applying the one or more reach extension techniques to the given channel comprises applying probabilistic constellation shaping to the given channel and activating symbol rate optimized subcarrier multiplexing for the given channel.

8. The method of claim 1, further comprising configuring one or more transponders to:
    transmit or receive traffic over the given channel using its initial modulation format and using the one or more reach extension techniques applied to the given channel; and
    transmit or receive traffic over the one or more channels assigned to wavelengths in the upper portion of the range using their respective initial modulation formats and without using reach extension techniques.

9. The method of claim 1, wherein applying the one or more reach extension techniques to the given channel comprises applying geometric shaping to the given channel.

10. An optical transport network for constellation shaping of modulation formats, the optical transport network comprising:
    a plurality of wavelength division multiplexed (WDM) channels, each assigned to a respective wavelength within a range of wavelengths;
    a network management system configured to:
        select, for each of the plurality of WDM channels, a respective initial modulation format with an initial distribution of constellation points in a complex plane;
        determine a target reach for the plurality of WDM channels that is achievable by one or more WDM channels assigned to wavelengths in an upper portion of the range using their respective initial modulation formats but is not achievable by one or more WDM channels assigned to wavelengths in a lower portion of the range using their respective initial modulation formats, the wavelengths in the lower portion of the range being shorter than the wavelengths in the upper portion of the range;
        apply one or more reach extension techniques to a given one of the one or more WDM channels assigned to wavelengths in the lower portion of the range to extend its reach to at least the target reach; and
        refrain from applying reach extension techniques to the one or more WDM channels assigned to wavelengths in the upper portion of the range; and
    one or more transponders configured to:
        transmit or receive traffic over the given one of the one or more WDM channels assigned to wavelengths in the lower portion of the range using its initial modulation format and using the one or more reach extension techniques applied to the given channel; and
        transmit or receive traffic over the one or more WDM channels assigned to wavelengths in the upper portion of the range using their respective initial modulation formats and without using reach extension techniques.

11. The optical transport network of claim 10, wherein to determine the target reach, the network management system is configured to calculate an expected reach for a channel assigned at a wavelength within a center portion of the range between the upper portion of the range and the lower portion of the range.

12. The optical transport network of claim 10, wherein to apply the one or more reach extension techniques to the given channel, the network management system is configured to activate symbol rate optimized subcarrier multiplexing for the given channel.

13. The optical transport network of claim 12, wherein to apply the one or more reach extension techniques to the given channel, the network management system is further configured to:
    select, dependent on characteristics of transmission media for the given channel and the target reach, a symbol rate for the given channel; and
    determine, dependent on the selected symbol rate, a number of subcarriers for the given channel.

14. The optical transport network of claim 10, wherein the network management system is further configured to apply one or more reach extension techniques to another one of the one or more WDM channels assigned to wavelengths in the lower portion of the range to extend its reach to at least the target reach.

15. The optical transport network of claim 14, wherein at least one of the reach extension techniques applied to the other channel is different than the one or more reach extension techniques applied to the given channel.

16. The optical transport network of claim 10, wherein to apply the one or more reach extension techniques to the given channel, the network management system is configured to apply probabilistic constellation shaping to the given channel and to activate symbol rate optimized subcarrier multiplexing for the given channel.

17. A method for reducing variance in reach of wavelength division multiplexed (WDM) channels in optical transport networks, comprising:

selecting, for each of a plurality of WDM channels in an optical network, each assigned to a respective wavelength within a range of wavelengths, a respective initial modulation format with an initial distribution of constellation points in a complex plane;

determining a target reach for the plurality of WDM channels that is achievable by one or more WDM channels assigned to wavelengths in an upper portion of the range using their respective initial modulation formats but is not achievable by one or more WDM channels assigned to wavelengths in a lower portion of the range using their respective initial modulation formats, the wavelengths in the lower portion of the range being shorter than the wavelengths in the upper portion of the range;

applying a reach extension technique by applying probabilistic constellation shaping to a given one of the one or more WDM channels assigned to wavelengths in the lower portion of the range to extend its reach to at least the target reach, the probabilistic shaping includes
    selecting a higher order modulation format for the given channel than its initial modulation format, and
    selecting, dependent on a target spectral efficiency for the given channel, a weak probabilistic shaping technique or a strong probabilistic shaping technique;

refraining from applying the reach extension technique to the one or more WDM channels assigned to wavelengths in the upper portion of the range;

transmitting or receiving traffic over the given one of the one or more WDM channels assigned to wavelengths in the lower portion of the range using the reach extension technique applied to the given channel; and transmitting or receiving traffic over the one or more WDM channels assigned to wavelengths in the upper portion of the range using their respective initial modulation formats and without using the reach extension technique.

* * * * *